(12) United States Patent
Nakajima et al.

(10) Patent No.: US 10,572,175 B2
(45) Date of Patent: Feb. 25, 2020

(54) METHOD AND APPARATUS OF SHARED STORAGE BETWEEN MULTIPLE CLOUD ENVIRONMENTS

(71) Applicant: HITACHI, LTD., Tokyo (JP)

(72) Inventors: Akio Nakajima, Santa Clara, CA (US); Akira Deguchi, Santa Clara, CA (US)

(73) Assignee: Hitachi, Ltd., Tokyo (JP)

( * ) Notice: Subject to any disclaimer, the term of this patent is extended or adjusted under 35 U.S.C. 154(b) by 1 day.

(21) Appl. No.: 15/538,241

(22) PCT Filed: Jun. 5, 2015

(86) PCT No.: PCT/US2015/034484
§ 371 (c)(1),
(2) Date: Jun. 21, 2017

(87) PCT Pub. No.: WO2016/195714
PCT Pub. Date: Dec. 8, 2016

(65) Prior Publication Data
US 2017/0351434 A1    Dec. 7, 2017

(51) Int. Cl.
*C12N 5/00* (2006.01)
*G06F 3/06* (2006.01)
*G06F 11/14* (2006.01)
*G06F 9/50* (2006.01)
(Continued)

(52) U.S. Cl.
CPC ............ *G06F 3/065* (2013.01); *G06F 3/0605* (2013.01); *G06F 3/067* (2013.01); *G06F 3/0619* (2013.01); *G06F 3/0683* (2013.01); *G06F 9/50* (2013.01); *G06F 11/14* (2013.01); *G06F 16/00* (2019.01); *G06F 16/128* (2019.01)

(58) Field of Classification Search
CPC ...... G06F 3/065; G06F 3/0683; G06F 3/0619; G06F 3/06; G06F 9/50; G06F 17/30088; G06F 17/30; G06F 11/14
See application file for complete search history.

(56) References Cited

U.S. PATENT DOCUMENTS 8,639,899 B2 *  1/2014  Kawakami ............ G06F 3/0608
                                                    711/114
8,799,413 B2 *  8/2014  Taylor .................. G06F 11/1435
                                                    709/219
(Continued)

OTHER PUBLICATIONS

International Search Report of PCT/US2015/034484 dated Oct. 7, 2015.

*Primary Examiner* — Ramon A. Mercado
(74) *Attorney, Agent, or Firm* — Mattingly & Malur, PC

(57) ABSTRACT

A computer system is coupled to a first storage system in a first site and a second storage system in a second site. The computer system comprises: a memory configured to store information which indicates that data in each segment of a plurality of segments of a logical unit is stored in the first storage system or the second storage system; and a processor configured to: receive an instruction to deploy an application, the instruction including access characteristic of the application; and determine if a snapshot of the logical volume is to be created either in the first storage system or the second storage system based on the access characteristic of the application and the information stored in the memory.

18 Claims, 28 Drawing Sheets

(51) Int. Cl.
*G06F 16/11* (2019.01)
*G06F 16/00* (2019.01)

(56) References Cited

U.S. PATENT DOCUMENTS

| | | | |
|---|---|---|---|
| 2007/0067586 A1* | 3/2007 | Mikami | G06F 11/1471 |
| | | | 711/162 |
| 2013/0246711 A1 | 9/2013 | Testardi et al. | |
| 2014/0040343 A1* | 2/2014 | Nickolov | G06F 9/4856 |
| | | | 709/201 |
| 2014/0245026 A1 | 8/2014 | Bates | |
| 2015/0026395 A1* | 1/2015 | Araki | G06F 12/0871 |
| | | | 711/103 |

\* cited by examiner

Volume table 40

| LU # | pool # | Capacity | volume type |
|---|---|---|---|
| 1 | 0 | 50 GB | primary |
| 2 | 0 | 50 GB | snapshot age 1 |
| 3 | 0 | 50 GB | snapshot age 2 |
| 4 | 1 | 100 GB | primary |
| 5 | 1 | 100 GB | secondary |
| ... | ... | ... | ... |

Pool table 50

| Pool # | Tier # | media type | capacity |
|--------|--------|------------|----------|
| 0 | 1 | Flash Drive | 10 GB |
|   | 2 | SAS HDD | 50 GB |
|   | 9 | Cloud vendor A | 1000 GB |
| 1 | 0 | Flash Cache | 10 GB |
|   | 9 | Cloud vendor B | unlimited |
| ... | ... | ... | ... |

FIG. 5

Cloud resource table 60

| media type | cost / capacity (monthly) | cost / traffic (monthly) | condition |
|---|---|---|---|
| Cloud vendor A | $100 / TB | get: $10 / 1k call | N/A |
| Cloud vendor B | $100 / TB | get : $10 / GB | < 10TB |
|  | $80 / TB | get : $5 / GB | > 10TB |
| ... | ... | ... | ... |

61, 62, 63, 64

FIG. 6 allocation table 70

| LU# (71) | segment # (72) | allocation (73) | Tier # (74) | Tier Copy # (75) | Snapshot (76) | allocated pool segment # (77) |
|---|---|---|---|---|---|---|
| 1 | 0 | Yes | 1 | 9 | N/A | 0, 1001 |
| 1 | 1 | Yes | 9 | N/A | N/A | 0 |
| 1 | 2 | No | N/A | N/A | N/A | N/A |
| 1 | 3 | Yes | 1 | N/A | N/A | 1 |
| 1 | ... | ... | ... | ... | ... | ... |
| 2 | 0 | Yes | 9 | N/A | Yes | 100 |
| 2 | 1 | No | N/A | N/A | No | N/A |
| 2 | 2 | Yes | 1 | 9 | Yes | 101, 1002 |
| 2 | 3 | No | N/A | N/A | No | N/A |
| ... | ... | ... | ... | ... | ... | ... |

FIG. 7

IO History table 80

| LU# | segment # | Access Counter |
|---|---|---|
| 1 | 0 | 0 |
|   | 1 | 1 |
|   | 2 | 1 |
|   | 3 | 0 |
|   | 4 | 2 |
| ... | ... | ... |

FIG. 8 cache table 150

| cache segment # 151 | segment # 152 | dirty data 153 |
|---|---|---|
| 1 | 10 | dirty |
| 2 | 100 | dirty |
| 3 | 5 | Clean |
| 4 | 8 | Clean |
| 5 | 1 | dirty |
| ... | ... | ... |

FIG. 15

METHOD AND APPARATUS OF SHARED STORAGE BETWEEN MULTIPLE CLOUD ENVIRONMENTS

BACKGROUND OF THE INVENTION

The present invention relates generally to storage systems and, more particularly, to shared storage between multiple cloud environments.

Currently a variety of cloud environments exist for storage systems. In a first example, a computer system in the on-premise site (referred to as private cloud) stores data to a storage system and the storage system has the capability of tiering data to the cloud storage system in the public cloud. Also, the storage system has the capability to use multiple cloud storage systems in order to use multiple tier media. In a second example, multiple computer systems in multiple cloud sites can access a storage system.

Currently a cloud storage gateway in the private cloud can store data to the private cloud and the public cloud. However, the cloud storage gateway currently is the only gateway to access data stored in the cloud system. A server in the public cloud cannot access data stored in the public cloud directly; instead the public cloud server can access data stored in the public cloud only via the cloud storage gateway in the private cloud. To read/write data from a server in the public cloud via the cloud storage gateway, the cloud storage reads data from the public cloud and then the cloud storage gateway sends the data to the public cloud.

U.S. Patent Application Publication No. 20140245026 discloses system and method for resource sharing across multi-cloud arrays. The system includes a plurality of storage arrays and a cloud array storage (CAS) application. The plurality of storage resources are distributed in one or more cloud storage arrays, and each storage resource comprises a unique object identifier that identifies location and structure of the corresponding storage resource at a given point-in-time.

U.S. Patent Application Publication No. 2013/0246711 discloses system and method for efficiently storing data both on-site and off-site in a cloud storage system. Data read and write requests are received by a cloud data storage system. The cloud storage system has at least three data storage layers: a first high-speed layer, a second efficient storage layer, and a third off-site storage layer. The first high-speed layer stores data in raw data blocks. The second efficient storage layer divides data blocks from the first layer into data slices and eliminates duplicate data slices. The third layer stores data slices at an off-site location.

U.S. Pat. No. 8,799,413 discloses distributing data for a distributed filesystem across multiple cloud storage systems. Two or more cloud controllers collectively manage distributed filesystem data that is stored in one or more cloud storage systems. The cloud controllers cache and ensure data consistency for the stored data. Whenever each cloud controller receives new data from a client, it outputs an incremental metadata snapshot for the new data that is propagated to the other cloud controllers and an incremental data snapshot containing the new data that is sent to a cloud storage system. During operation, data stored in the distributed filesystem can be distributed across two or more cloud storage systems to optimize performance and/or cost for the distributed filesystem.

BRIEF SUMMARY OF THE INVENTION

Exemplary embodiments of the invention provide a cloud storage gateway in the private cloud site, the cloud storage gateway having thin provisioning, tier, and snapshot functionalities. The cloud storage gateway can create snapshots in both the private cloud site and the public cloud site. The cloud storage gateway decides which cloud site in which the create snapshots based on IO access pattern provided by the administrator. When the cloud storage gateway creates a snapshot in the public cloud site, the cloud storage gateway sends snapshot information to a storage proxy in the public cloud site and copies residual data segments to the cloud storage system via the storage proxy in the public cloud site. The storage proxy can be used to provide access to the snapshot data in the cloud storage system of the public cloud site. The cloud storage gateway can access both site in the private cloud site or public cloud site via storage proxy in the public cloud.

An aspect of the present invention is directed to a computer system coupled to a first storage system in a first site and a second storage system in a second site. The computer system comprises: a memory configured to store information which indicates that data in each segment of a plurality of segments of a logical unit is stored in the first storage system or the second storage system; and a processor configured to: receive an instruction to deploy an application, the instruction including access characteristic of the application; and determine if a snapshot of the logical volume is to be created either in the first storage system or the second storage system based on the access characteristic of the application and the information stored in the memory.

In some embodiments, the computer system is disposed in the first site; and the processor is configured to create the snapshot of the logical volume in the first storage system based on the determining. The computer system is disposed in the first site; and the processor is configured to create the snapshot of the logical volume in the second storage system based on the determining and to copy residual segments of the logical unit to the second storage system, the residual segments containing data for which no tier copy has been made. The processor is configured to: if the snapshot of the logical volume is created in the first storage system, indicate that the application is to be deployed in the first site; and if the snapshot of the logical volume is created in the second storage system, indicate that the application is to be deployed in the second site.

In specific embodiments, the computer system is disposed in the first site, and the processor is configured to: calculate read IO (input/output) cost to read data from the second storage system based on the access characteristic of the application; calculate capacity cost in the second storage system; compare the read IO cost with the capacity cost; if the read IO cost is not greater than the capacity cost, then create the snapshot of the logical volume in the first storage system; and if the read IO cost is greater than the capacity cost, then create the snapshot of the logical volume in the second storage system and copy residual segments of the logical unit to the second storage system, the residual segments containing data for which no tier copy has been made.

In some embodiments, the access characteristic of the application indicates whether to read the entire data in the logical unit or not and, if not, specifies a portion of the data to be read. The capacity cost is calculated based on at least one of: cloud media type to store the data, cost per capacity for each media type, cost per traffic for each media type, any capacity condition affecting the cost per capacity for each media type, and any capacity condition affecting the cost per traffic for each media type.

In specific embodiments, the computer system is disposed in the first site; the first site is a private cloud site and the second site is a public cloud site; and the first storage system is coupled to the second storage system via an IP (Internet Protocol) network.

In some embodiments, the computer further comprises a cache memory divided into cache segments having a fixed segment size. The computer system is disposed in the first site. The processor is configured to detect if there is insufficient cache capacity in a read/write operation or not and, if there is insufficient cache capacity in the read/write operation, then for each cache segment: check to see if said each cache segment is clean or dirty; if said cache segment is clean, delete the clean cache segment from the cache memory; and if said cache segment is dirty, then check IO (Input/Output) access frequency for said dirty cache segment, and if the IO access frequency is lower than a preset threshold, then destage the dirty cache segment to the first storage system, and if the IO access frequency is not lower than the preset threshold, then destage the dirty cache segment to the second storage system.

Another aspect of the invention is directed to a method of operating a computer system coupled to a first storage system in a first site and a second storage system in a second site. The method comprises: storing information which indicates that data in each segment of a plurality of segments of a logical unit is stored in the first storage system or the second storage system; and receiving an instruction to deploy an application, the instruction including access characteristic of the application; and determining if a snapshot of the logical volume is to be created either in the first storage system or the second storage system based on the access characteristic of the application and the information stored in the memory.

Another aspect of this invention is directed to a non-transitory computer-readable storage medium storing a plurality of instructions for controlling a data processor to operate a computer system coupled to a first storage system in a first site and a second storage system in a second site. The plurality of instructions comprise: instructions that cause the data processor to store information which indicates that data in each segment of a plurality of segments of a logical unit is stored in the first storage system or the second storage system; and instructions that cause the data processor to receive an instruction to deploy an application, the instruction including access characteristic of the application; and instructions that cause the data processor to determine if a snapshot of the logical volume is to be created either in the first storage system or the second storage system based on the access characteristic of the application and the information stored in the memory.

These and other features and advantages of the present invention will become apparent to those of ordinary skill in the art in view of the following detailed description of the specific embodiments.

BRIEF DESCRIPTION OF THE DRAWINGS

FIG. 2b illustrates an example of a memory in the cloud storage gateway of FIG. 2a.

FIG. 3b illustrates an example of a memory in the storage proxy of FIG. 3a.

FIG. 4 illustrates an example of a volume table.

FIG. 5 illustrates an example of a pool table.

FIG. 6 illustrates an example of a cloud resource table.

FIG. 7 illustrates an example of an allocation table.

FIG. 8 illustrates an example of an IO history table.

FIG. 14b illustrates an example of a memory in the cloud storage gateway of FIG. 14a.

FIG. 15 illustrates an example of a cache table.

DETAILED DESCRIPTION OF THE INVENTION

Figure 1:
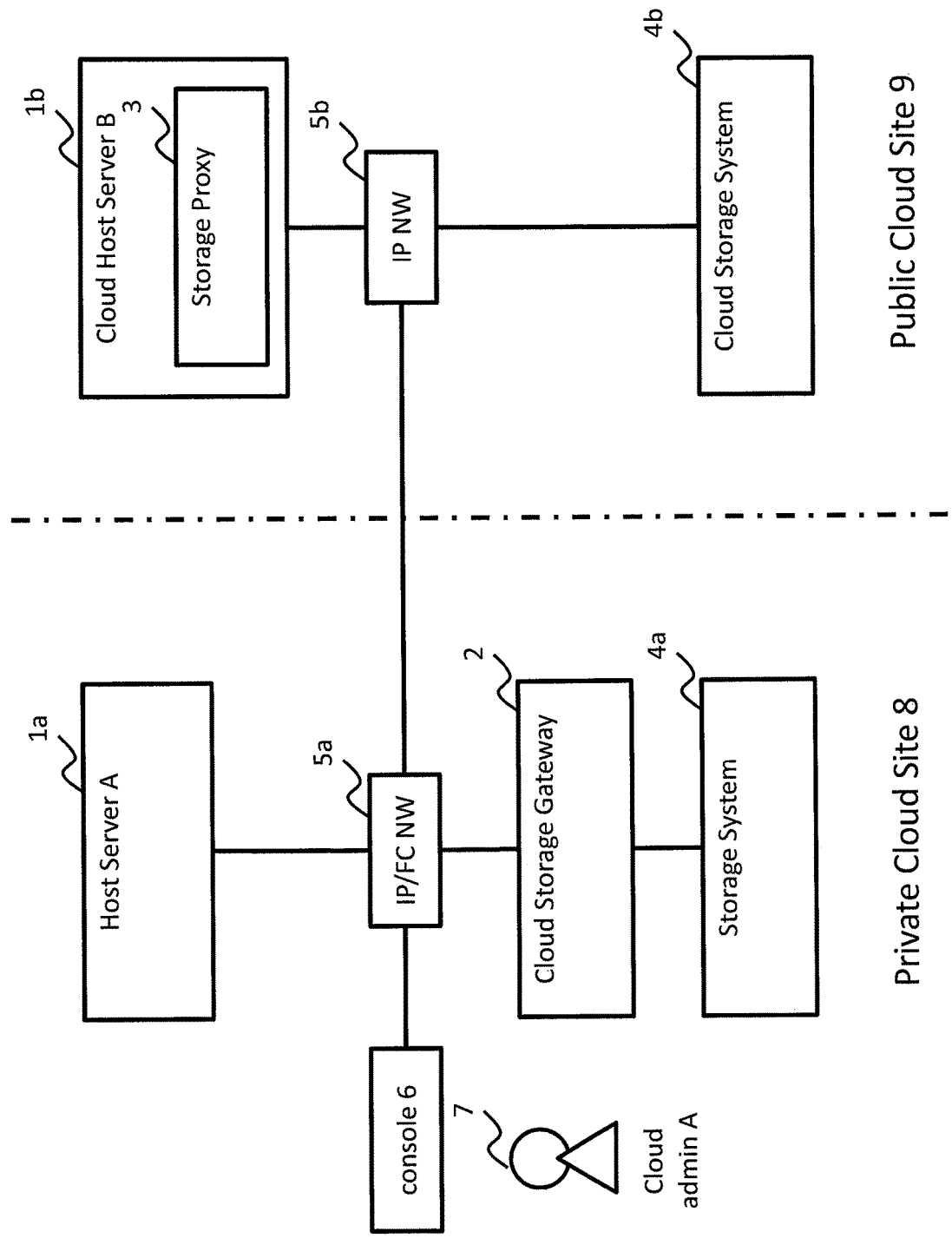
FIG. 1 illustrates an example of a hardware configuration of a multiple cloud environment for a computer system in which the method and apparatus of the invention may be applied according to a first embodiment of the present invention.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art. Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium including non-transitory medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus. Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for providing shared storage between multiple cloud environments.

First Embodiment

FIG. 1 illustrates an example of a hardware configuration of a multiple cloud environment for a computer system in which the method and apparatus of the invention may be applied according to a first embodiment of the present invention. The computer system has a private cloud site 8 and a public cloud site 9, and connect IP network between the sites. On the private cloud site 8 are a host server A 1*a*, a cloud storage gateway 2, a storage system 4*a*, and IP/FC NW (Fibre Channel Network) 5*a*, as well as a cloud administrator 7 managing the computer system via a management console 6. On the public cloud site 9 are a cloud host server B 1*b* including a storage proxy 3, a cloud storage system 4*b*, and IP network 5*b*.

Figure 2B:
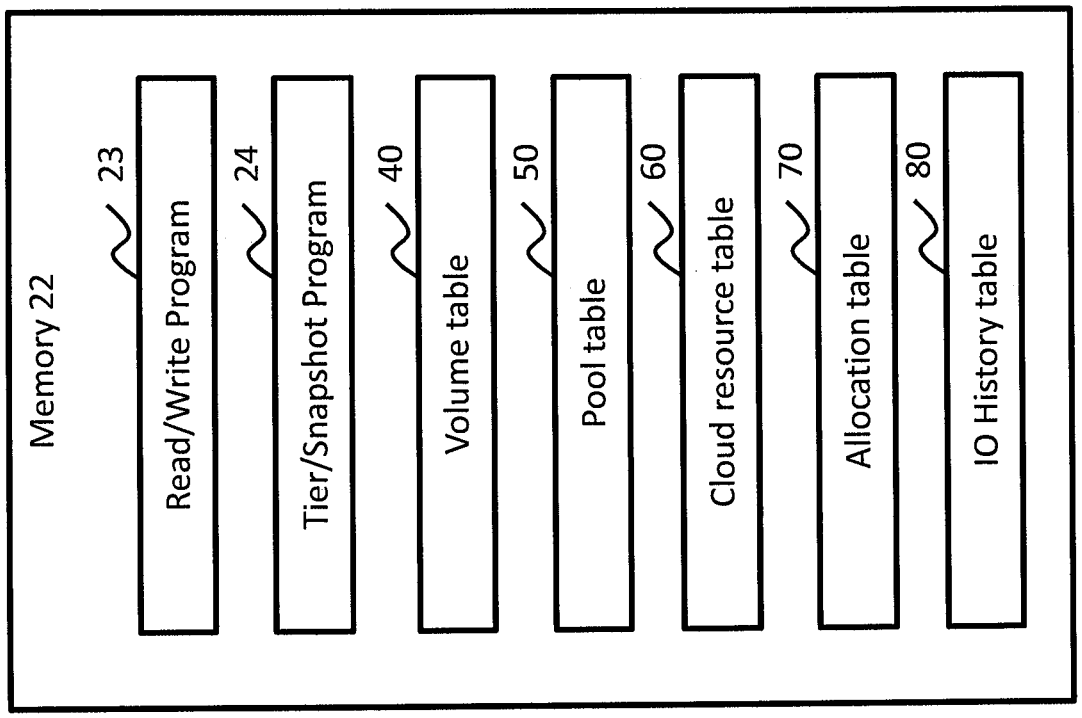
Figure 2A:
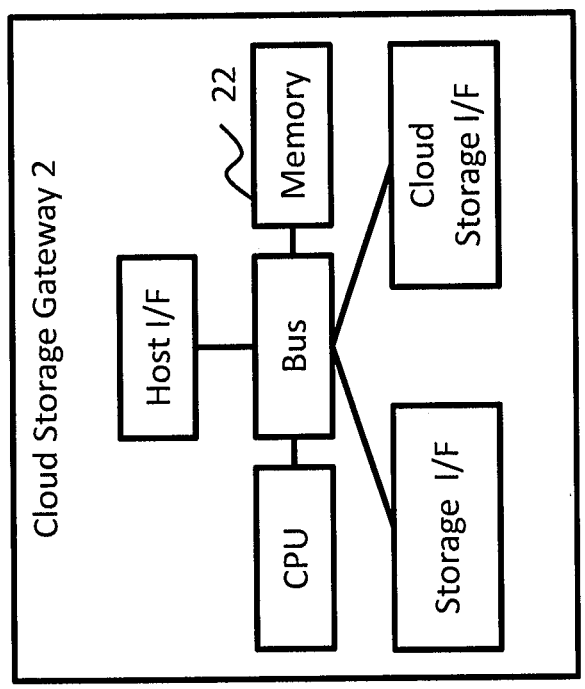
FIG. 2a illustrates an example of a cloud storage gateway according to the first embodiment.

FIG. 2*a* illustrates an example of a cloud storage gateway according to the first embodiment. The cloud storage gateway 2 includes plural host I/Fs (Interfaces) which connect to host, CPU, memory 22, storage I/F, and cloud storage I/F, and the components are connected to each other by bus I/F such as PCI, DDR, or SCSI. The storage I/F is connected to the storage system 4*a*. The host I/F is connected to the host server 1*a*.

FIG. 2*b* illustrates an example of a memory in the cloud storage gateway of FIG. 2*a*. The memory 22 of the cloud storage gateway 2 contains read and write program 23, tier and snapshot program 24, volume table 40 (FIG. 4), pool table 50 (FIG. 5), cloud resource table 60 (FIG. 6), allocation table 70 (FIG. 7), and IO history table 80 (FIG. 8).

Figure 3B:
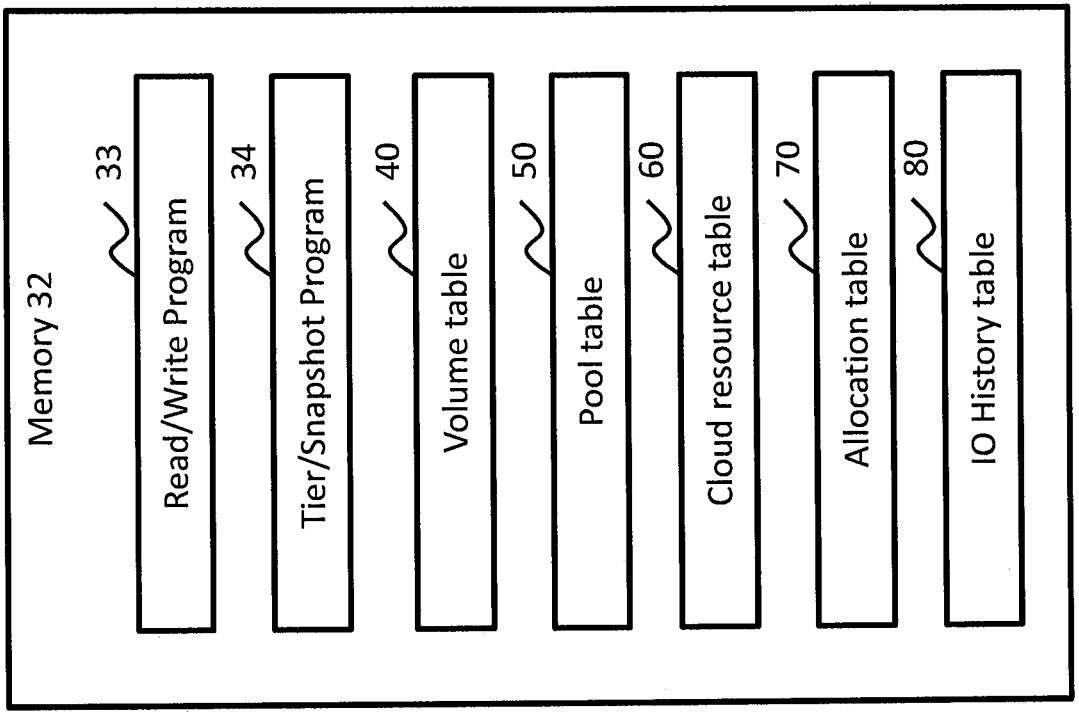
Figure 3A:
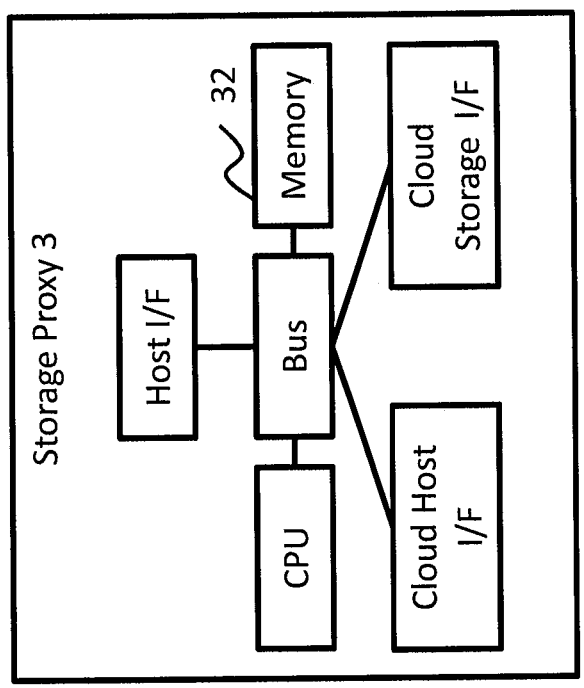
FIG. 3a illustrates an example of a storage proxy.

FIG. 3*a* illustrates an example of a storage proxy. The storage proxy 3 contains plural host I/Fs which connect to host, CPU, memory 32, storage I/F, and cloud host I/F, and the components are connected to each other by bus I/F such as PCI, DDR, or SCSI. The cloud host I/F is connected to the cloud storage I/F in the cloud storage gateway 2. The cloud storage I/F is connected to the cloud storage system 4*b*. The host I/F is connected to the OS in the cloud host server 1*b*.

FIG. 3*b* illustrates an example of a memory in the storage proxy of FIG. 3*a*. The memory 32 of the storage proxy software 3 contains read and write program 33, tier and snapshot program 34, volume table 40 (FIG. 4), pool table 50 (FIG. 5), cloud resource table 60 (FIG. 6), allocation table 70 (FIG. 7), and IO history table 80 (FIG. 8).

FIG. 4 illustrates an example of a volume table. The volume table 40 contains LU (logical unit) number field 41, pool number field 42, capacity field 43, and volume type field 44. The LU number field 41 contains a unique identifier of the LU. The pool number field 42 contains pool information which relates to the pool table 50. The capacity field 43 contains capacity of the LU. The volume type field 44 contains kind of the LU type such as primary volume, snapshot volume, or secondary copy volume. When the volume type field 44 contains snapshot type, the number or numerical value of snapshot age is contained in the field. The 0th snapshot age is the primary volume.

FIG. 5 illustrates an example of a pool table. The pool table 50 contains pool number field 51, tier number field 52, media type field 53, and media capacity field 54. The pool number field 51 contains a unique identifier of pool volume. Each pool contains one or multiple media types. The tier number field 52 contains identifier of media type in the pool. The media type field 53 contains the kind of media type such as flash cache, flash drive, SAS HDD, SATA HDD, and cloud storage. The types of cloud storage are supported types of multiple vendors. The media capacity field 54 contains maximum media capacity to allocate segments to LU.

FIG. 6 illustrates an example of a cloud resource table. The cloud resource table 60 contains media type field 61, cost per capacity field 62, cost per traffic field 63, and condition of cost calculation field 64. The media type field 61 contains cloud media type which is defined by media type field 53. The cost per capacity field 62 contains cost per capacity ratio in monthly charge. The cost per traffic field 63 contains cost per traffic ratio in monthly charge. The condition of cost calculation field 64 contains a condition to calculate cost per capacity field 62 and/or cost per traffic field 63.

FIG. 7 illustrates an example of an allocation table. The allocation table 70 includes information for thin provisioning management, tier management, and snapshot management. The allocation table 70 contains LU number field 71, segment number field 72, allocation field 73, tier number field 74, tier copy number field 75, snapshot field 76, and allocated pool segment number 77. The LU number field 71 contains a unique identifier of the LU which is defined by the volume table 40. The segment number field 72 contains a unique identifier of segment in the LU. A segment size is a fixed size such as 256 kB and divides the entire capacity of the LU. The allocation field 73 contains a flag that indicates whether or not the host write is allocated and data is stored to the allocated pool segment number 77 in the pool volume for thin provisioning management or tier management. The tier number field 74 contains a tier number that the segment is stored in the pool volume. The tier number is defined by the pool table 50. The tier copy number field 75 contains a tier number that the segment data is copied to in the pool volume. When the tier number 74 and tier copy number 75 are defined, the same data set are stored to multiple tiers in the pool across private cloud site and public cloud site. The snapshot field 76 contains a flag that indicates whether or not the host write is allocated and data is stored to the allocated pool segment number 77 in the pool volume for snapshot management. The allocated pool segment number 77 is a unique address in the pool volume which resides in the LU. Each pool volume is divided in fixed size segments and each pool segment is assigned a unique pool segment number. The allocated pool segment number 77 is used for thin provisioning, tier management, or snapshot management. If both of the tier number field 74 and the tier copy number field 75 are set to valid values, then the allocated pool segment number 77 contains two segment numbers for the two fields, respectively.

FIG. 8 illustrates an example of an IO history table. The IO history table 80 contains LU number field 81, segment number field 82, and access counter field 83. The LU number field 81 contains LU number that is defined by the volume table 40. The segment number field 82 contains segment number which is defined by segment number field 72 in the allocation table 70. The access counter field 83 contains read access frequency as up/down counter. The access counter 83 is reset at fixed interval.

Figure 9:
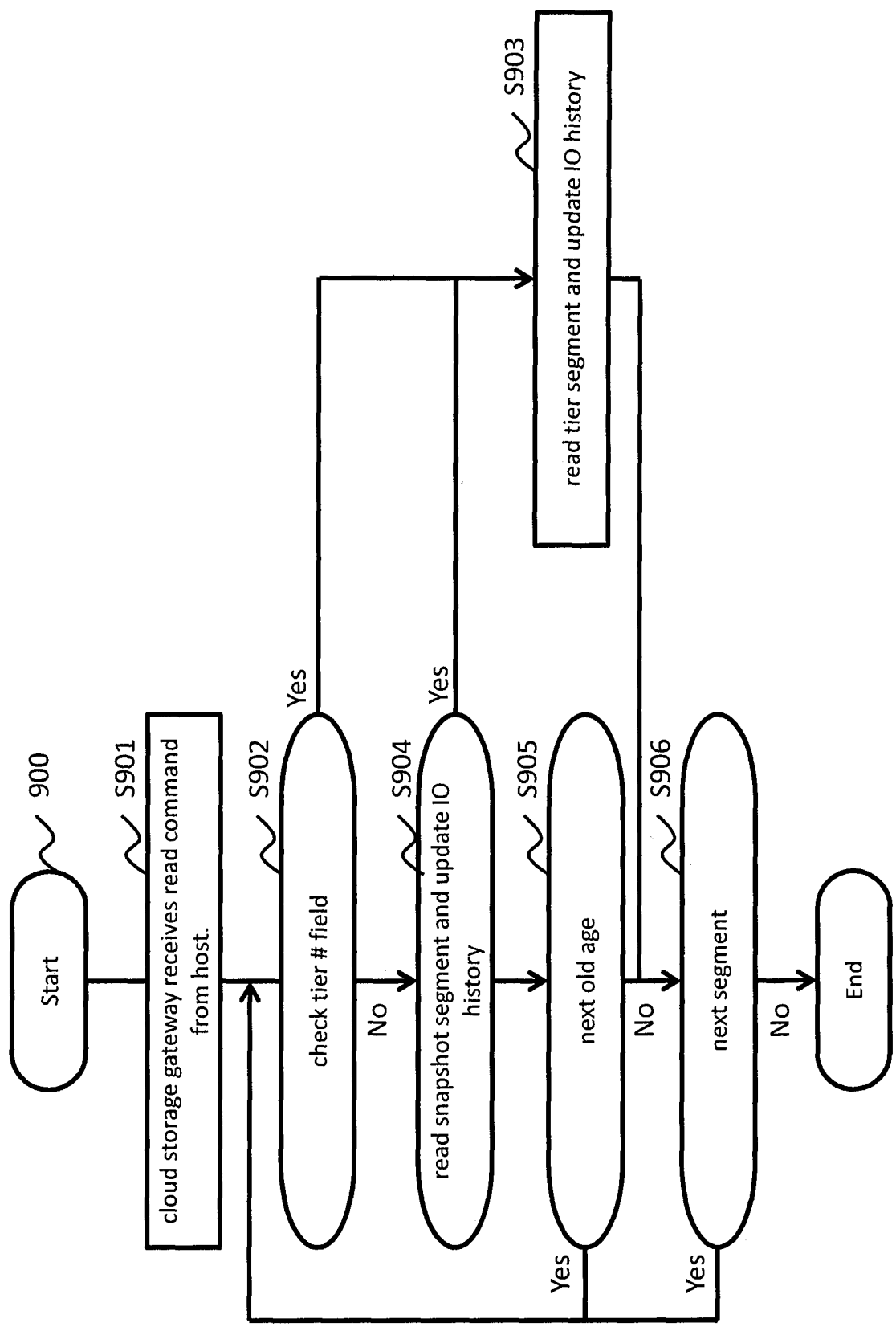
FIG. 9 shows an example of a flow diagram illustrating a process for a read operation of a read/write program.

FIG. 9 shows an example of a flow diagram illustrating a process for a read operation of a read/write program. In step S901, the cloud storage gateway receives a read command from host system 1. The read/write program 23 divides the read command according to the segment size and calculates segment number in each of the segments. The program 23 further sets current snapshot age as the volume if the volume type is snapshot. In step S902, the program 23 checks the tier number field 74 corresponding to the segment number. If the tier number field 74 contains a valid value (YES), the next step is S903. If No, the next step is S904. In step S903, the program 23 reads the segment from the corresponding tier segment as set in step S902 and updates the IO history table 80. Then the next step is S906. In step S904, the program 23 checks the snapshot number field 76 corresponding to the segment number, reads the snapshot segment, and updates the IO history. If the snapshot number field 76 is set to Yes value (YES), the next step is S903. If No, the next step is S905. In step S905, the program 23 checks the snapshot age number in the volume table 40 (see volume type 44 in FIG. 4). If the snapshot is not primary age (i.e., age is not 0), the snapshot age is decremented and the next step is S902. If the snapshot is primary age (i.e., age is 0), the segment data is unassigned, and thus the program creates zero fill data as the segment and the next step is S906. In step S906, the program 23 checks whether the segment is end of the read command. If the segment is partial of the command (Yes), i.e., it is not end of the read command, the next step is S902. If No, then the program returns all data of the divided segments to the host.

Figure 10:
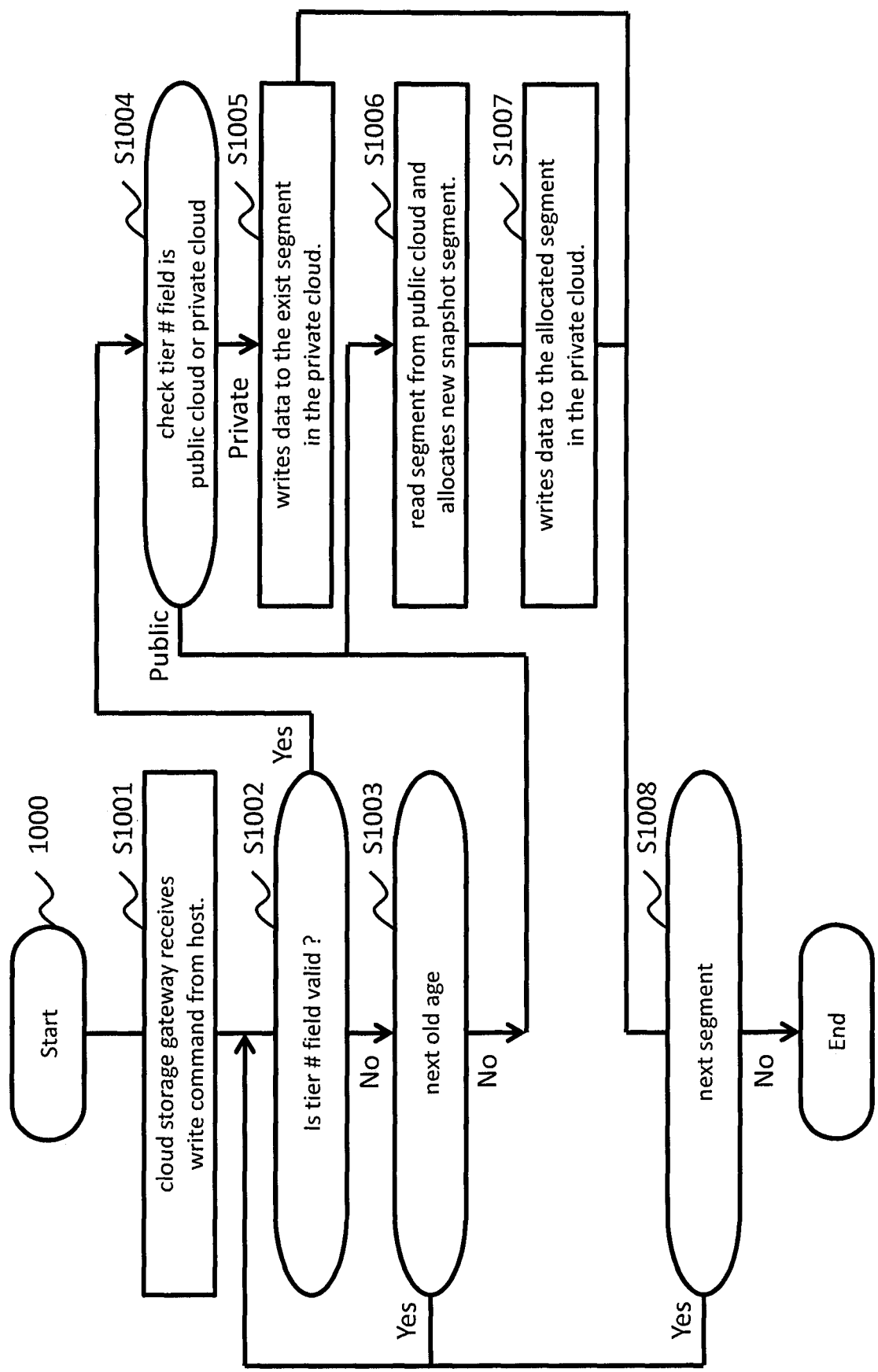
FIG. 10 shows an example of a flow diagram illustrating a process for a write operation of a read/write program.

FIG. 10 shows an example of a flow diagram illustrating a process for a write operation of a read/write program. In step S1001, the cloud storage gateway receives a write command from host system 1. The read/write program 23 returns command status, divides the write command according to segment size, and calculates segment number in each of the segments. Also, the program 23 sets the current snapshot age as the volume if the volume type is snapshot. In step S1002, the program 23 checks the tier number field 74 corresponding to the segment number. If the tier number field 74 contains a valid value (YES), the next step is S1003. If No, the next step is S1004.

In step 1004, the program 23 checks the tier number field 74 to determine whether it indicates private cloud or public cloud. The tier number is defined media type of private cloud or public cloud by the pool table 50. If the tier number field 74 contains private cloud media (Private), the next step is S1005. If it is public cloud media (Public), the next step is S1006. In step S1005, the program overwrites host data to the existing segment in the private cloud. The next step is S1008. In step S1006, the program reads the segment from the corresponding tier segment of the public cloud and allocates a new snapshot segment in the private cloud and updates the snapshot field in the current LU snapshot age. In step S1007, the program writes host data to the allocated new snapshot segment in the private cloud. The next step is S1008.

In step S1003, the program 23 checks the snapshot age number in the volume table 40. If the snapshot is not primary age (age is not 0), then the snapshot age is decremented and the next step is S1002. If the snapshot is primary age (age is 0), then the segment data is unassigned, so that the program creates zero fill data as the segment and the next step is S1006, which is described above.

In step S1008, the program 23 checks whether the segment is the end of the write command. If the segment is partial of the command (Yes), i.e., it is not end of the write command, the next step is S1002. If No, then the program has finished processing the write command.

Figure 11:
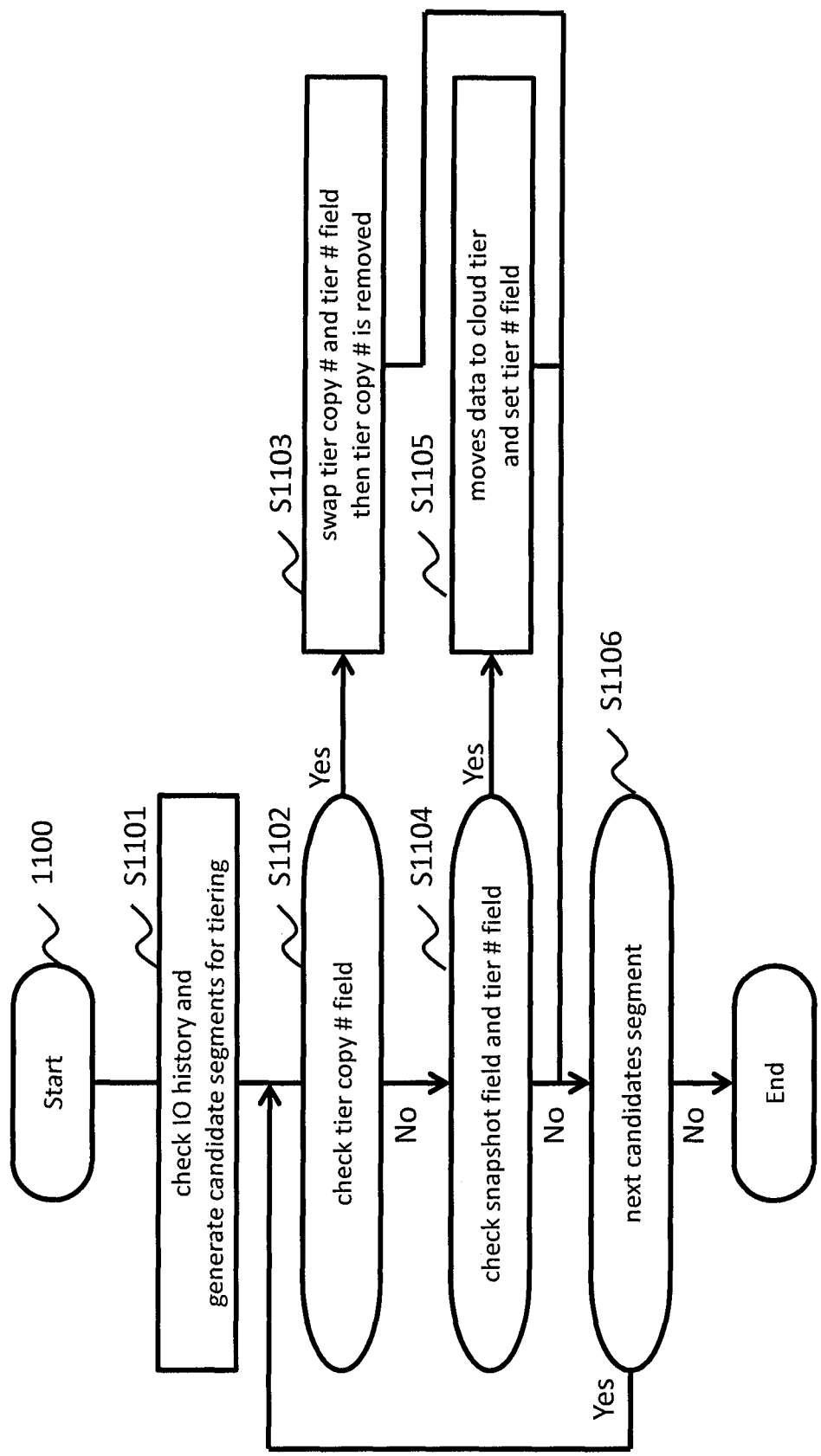
FIG. 11 shows an example of a flow diagram illustrating a process for a tier move operation of a tier and snapshot program.

FIG. 11 shows an example of a flow diagram illustrating a process for a tier move operation of a tier and snapshot program. The process is run to tier data to the cloud storage when the capacity of the private cloud storage is insufficient. In step S1101, the tier/snapshot program 24 checks the IO history 80 and generates candidate segments to tier to the cloud. The candidate segments are typically low frequency access segments. The candidate segments data will be moved to the cloud storage. In step S1102, the program 24 checks the tier copy number field 75 corresponding the segment number. If the tier copy number field 75 contains a valid value (YES), the next step is S1103. If No, the next step is S1104. In step S1103, the program 24 swaps the value of the tier copy number field 75 and the tier number field 74. Then the program deletes the segment data which is related to the tier number field 74. Then the program removes the value of the tier copy number. The next step is S1106. In step S1104, the program 24 checks the snapshot number field 76 corresponding to the segment number. If the snapshot number field 76 is set to Yes value (YES), the next step is S1105. If No, then next step is S1106. In step S1105, the program 24 moves the segment to the cloud tier. The program allocates new segment in the cloud tier media and sets the tier number field. Then the program deletes the snapshot or thin provisioning segment in the private storage and de-allocates the allocated segment. The next step is S1106. In step S1106, the program 24 checks whether the segment is the end of the candidate segments. If the segment is partial of the candidate segments (Yes), i.e., it is not end of the candidate segments, the next step is S1102. If No, then the tiering process to the public cloud is finished.

Figure 12:
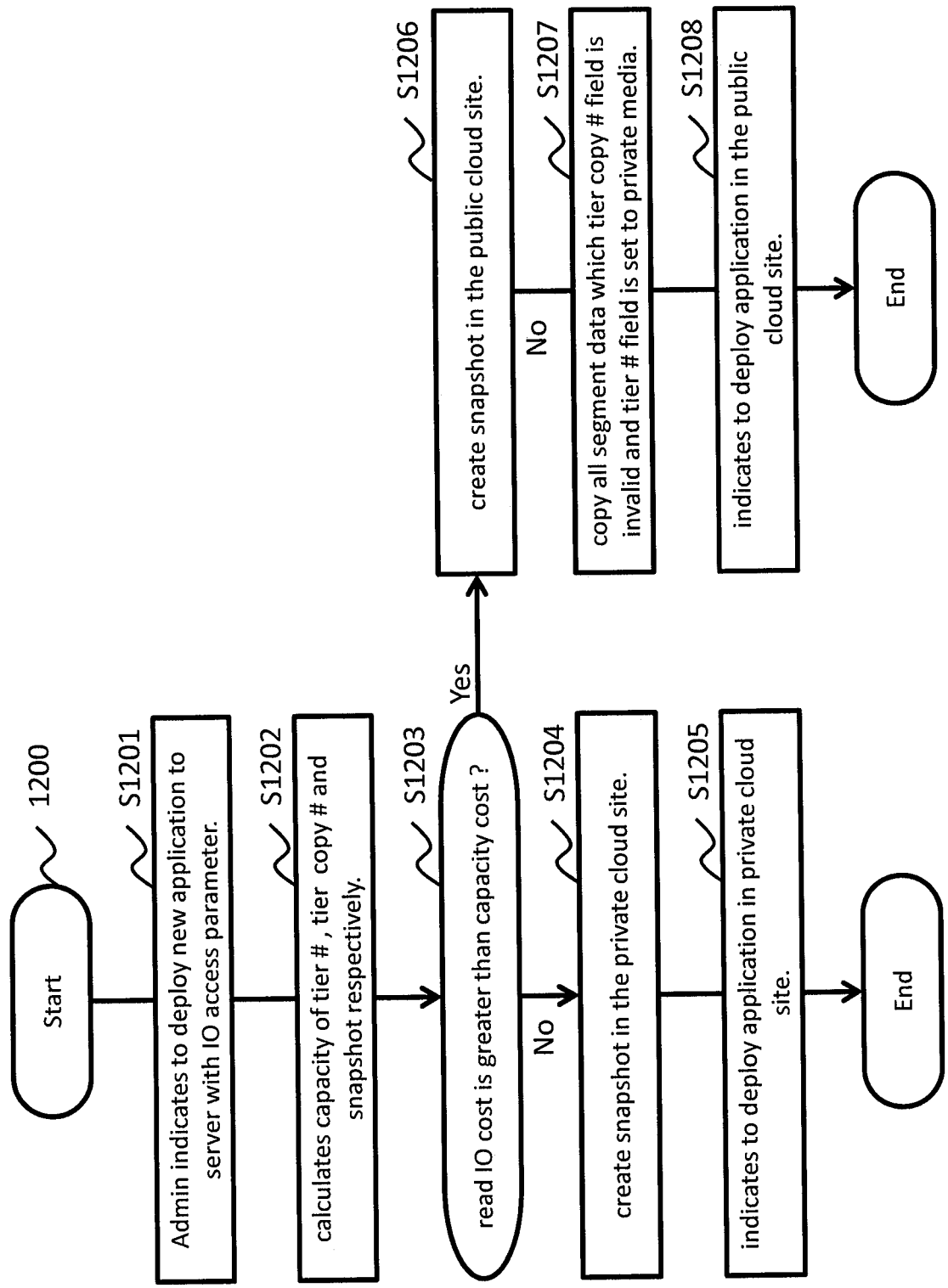
FIG. 12 shows an example of a flow diagram illustrating a process for creating a snapshot volume in the private cloud or public cloud from the cloud storage gateway.

FIG. 12 shows an example of a flow diagram illustrating a process for creating a snapshot volume in the private cloud or public cloud from the cloud storage gateway. In step S1201, the administrator indicates to deploy a new application to the server. The administrator indicates the IO access pattern of the application. The IO access pattern can choose a type of application such as specifying that only latest data is accessed by the real-time analytics application, or that the whole of data is accessed by the historical analytics application. In step S1202, the tier/snapshot program 24 calculates the total capacity of the tier number field 74, the total capacity of the tier copy number field 75, and the total capacity of the snapshot field 76. In step S1203, the program 24 compares the read IO cost to read data from the public cloud and the capacity cost in the public cloud. If the read IO cost is greater than the capacity cost (Yes), the next step is S1206. If No, the next step is S1204.

In step S1204, the program 24 creates a snapshot in the private cloud site. In step S1205, the program 24 indicates that administrator shall deploy the application in the private cloud site. Then the process ends. In step S1206, the program 24 creates a snapshot in the public cloud site. In step S1207, the program 24 copies all segments data for which the related tier copy number field 75 has no set valid value (this step copies residual segments containing data for which no tier copy has been made). Then the program sets the tier copy number field to private media. The program sends the snapshot information in the snapshot field 76 to the storage proxy software 3. In step S1208, the program 24 indicates that the administrator shall deploy the application in the public cloud site. Then the process ends.

Figure 13:
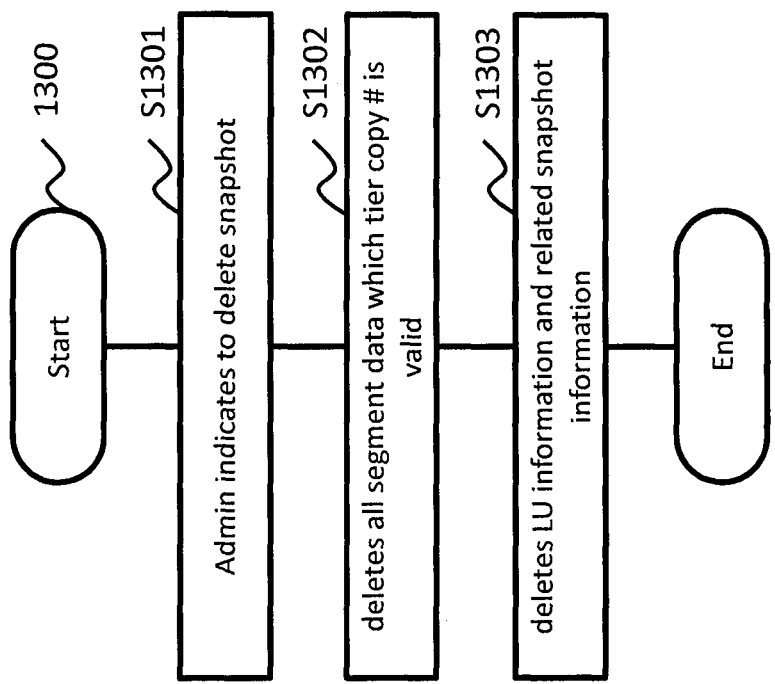
FIG. 13 shows an example of a flow diagram illustrating a process for deleting a snapshot volume in the public cloud from the cloud storage gateway.

FIG. 13 shows an example of a flow diagram illustrating a process for deleting a snapshot volume in the public cloud from the cloud storage gateway. In step S1301, the administrator indicates to delete snapshot volume. In step S1302, the program 24 deletes all segment data for which the tier copy number is valid. In step S1303, the program deletes all allocated segments for which the segment is not referenced by other newer snapshot age. Also, the program deletes LU information in the volume table 40 and snapshot information in the allocation table 70.

Second Embodiment

Figure 14B:
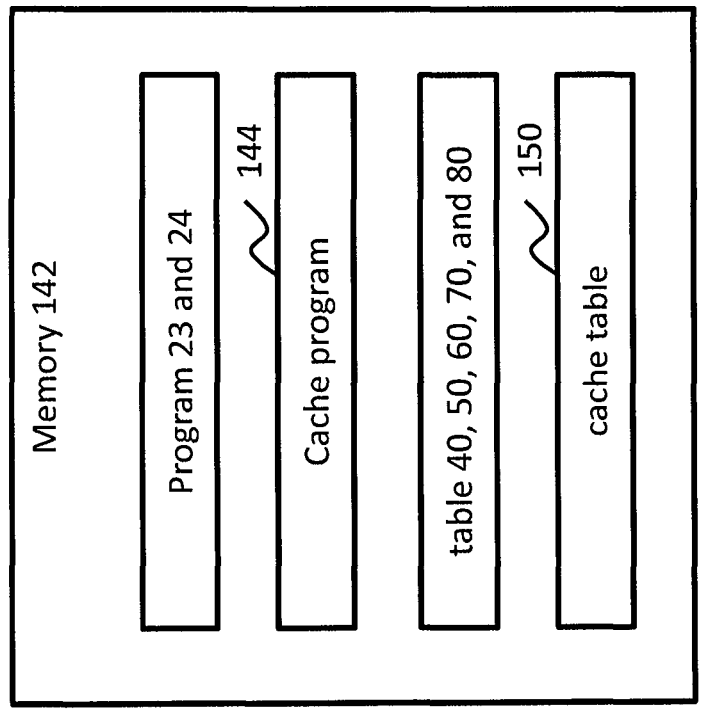
Figure 14A:
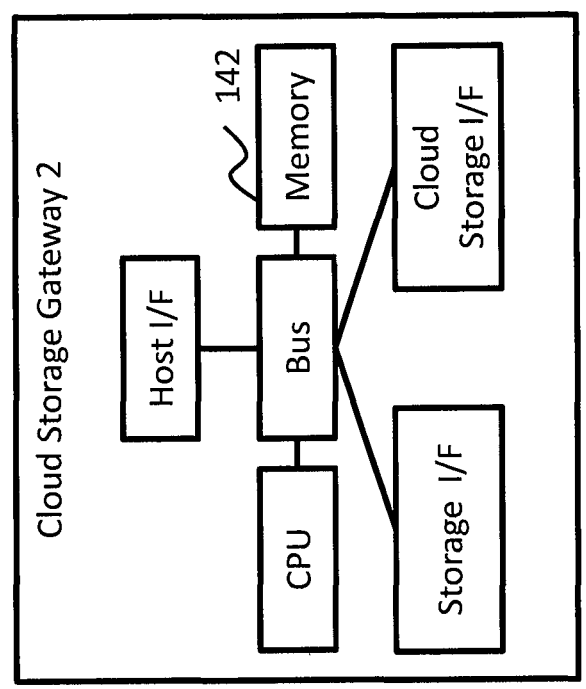
FIG. 14a illustrates an example of a cloud storage gateway according to a second embodiment.

FIG. 14a illustrates an example of a cloud storage gateway according to a second embodiment. FIG. 14b illustrates an example of a memory in the cloud storage gateway of FIG. 14a. FIGS. 14a and 14b are similar to FIGS. 2a and 2b. A memory 142 of the cloud storage gateway 2 has cache program 144 (FIG. 16) and cache table 150 (FIG. 15). Other program 23, 24 and table 40, 50, 60, 70, 80 are the same as those in FIG. 2b.

FIG. 15 illustrates an example of a cache table. The cache table 150 includes cache segment number field 151, segment number field 152, and dirty data flag field 153. The cache segment number field 151 contains a unique number of cache segment for the cache memory which is divided according to a fixed segment size. The segment number field 152 is reference of LU segment which is defined by the allocation table 70. The dirty data flag field 153, when set to dirty, means that write data is not stored in the media. The flag is set to clean when the segment data is stored to media.

Figure 16:
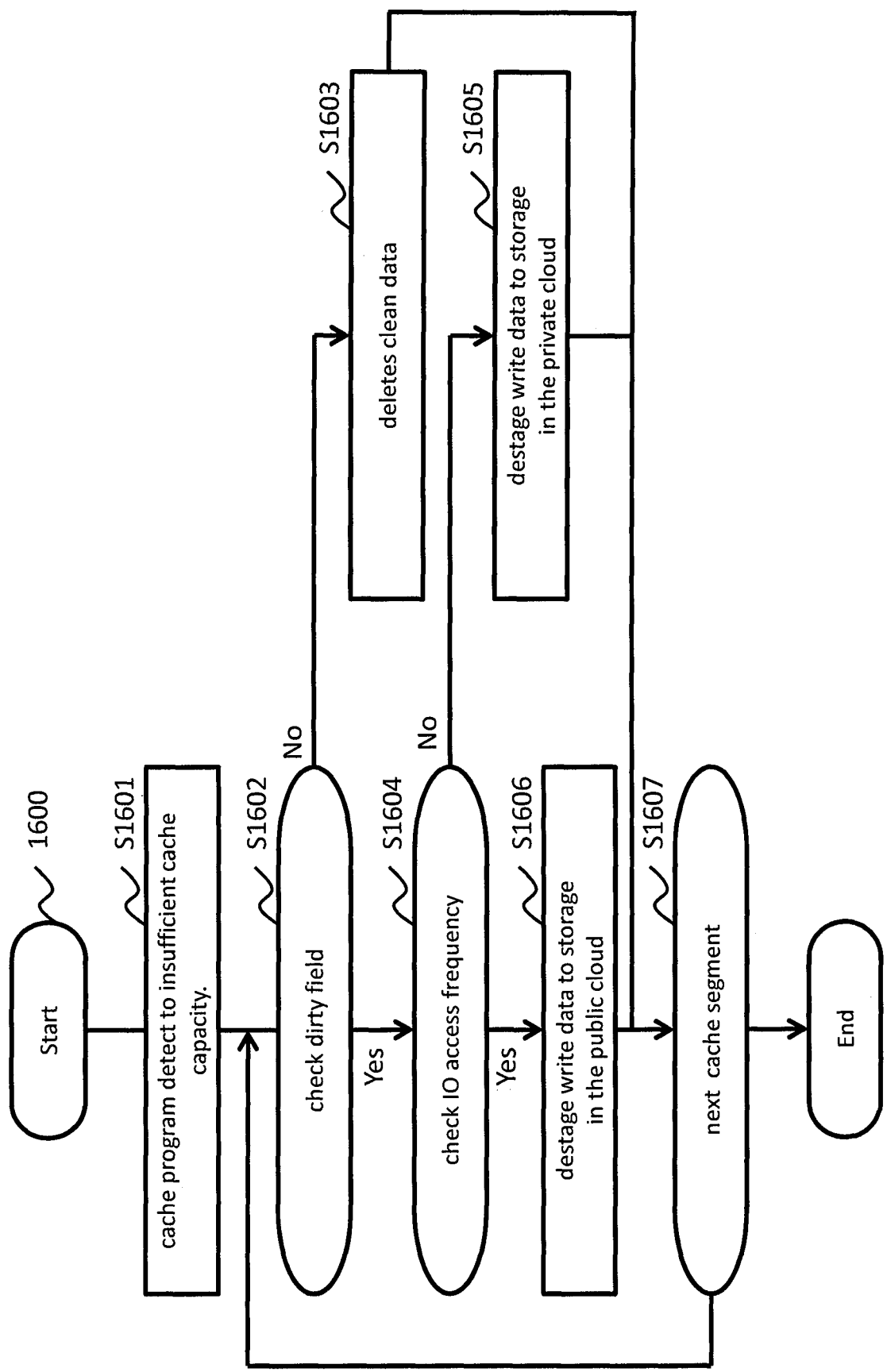
FIG. 16 shows an example of a flow diagram illustrating a process for a tier move operation of the cache program.

FIG. 16 shows an example of a flow diagram illustrating a process for a tier move operation of the cache program. The process is run to tier data to the cloud storage when the capacity of the private cloud storage is insufficient. In step S1601, the cache program 144 detects insufficient cache capacity in the host read or host write operation. In step S1602, the program 144 checks the dirty data flag field 152 corresponding to the segment number 151. If the dirty data flag field 152 is set to dirty (YES), the next step is S1604. If No, the next step is S1603. In step S1603, the program 144 deletes clean segment in the cache. The next step is S1607. In step S1604, the program 144 checks the IO history 80. If the segments are low frequency access (Yes), then the segments data will be moved to the public cloud storage, and the next step is S1606. If No, the next step is S1605. In step S1605, the program 144 destages dirty segment in the cache to the storage in the private cloud. The next step is S1607. In step S1606, the program 144 destages the dirty segment to the public cloud tier. The program allocates new segment in the public cloud tier media and set the tier number field. Then the program deletes snapshot or thin provisioning segment in the private storage and de-allocates the allocated segment. The next step is S1607. In step S1607, the program 24 checks whether the segment is end of the cache segments. If the segment is partial of the cache segments (Yes), i.e., the segment is not end of the cache segments, the next step is S1602. If No, then the destage process with tiering to public cloud in the cache program is finished.

Third Embodiment

Figure 17:
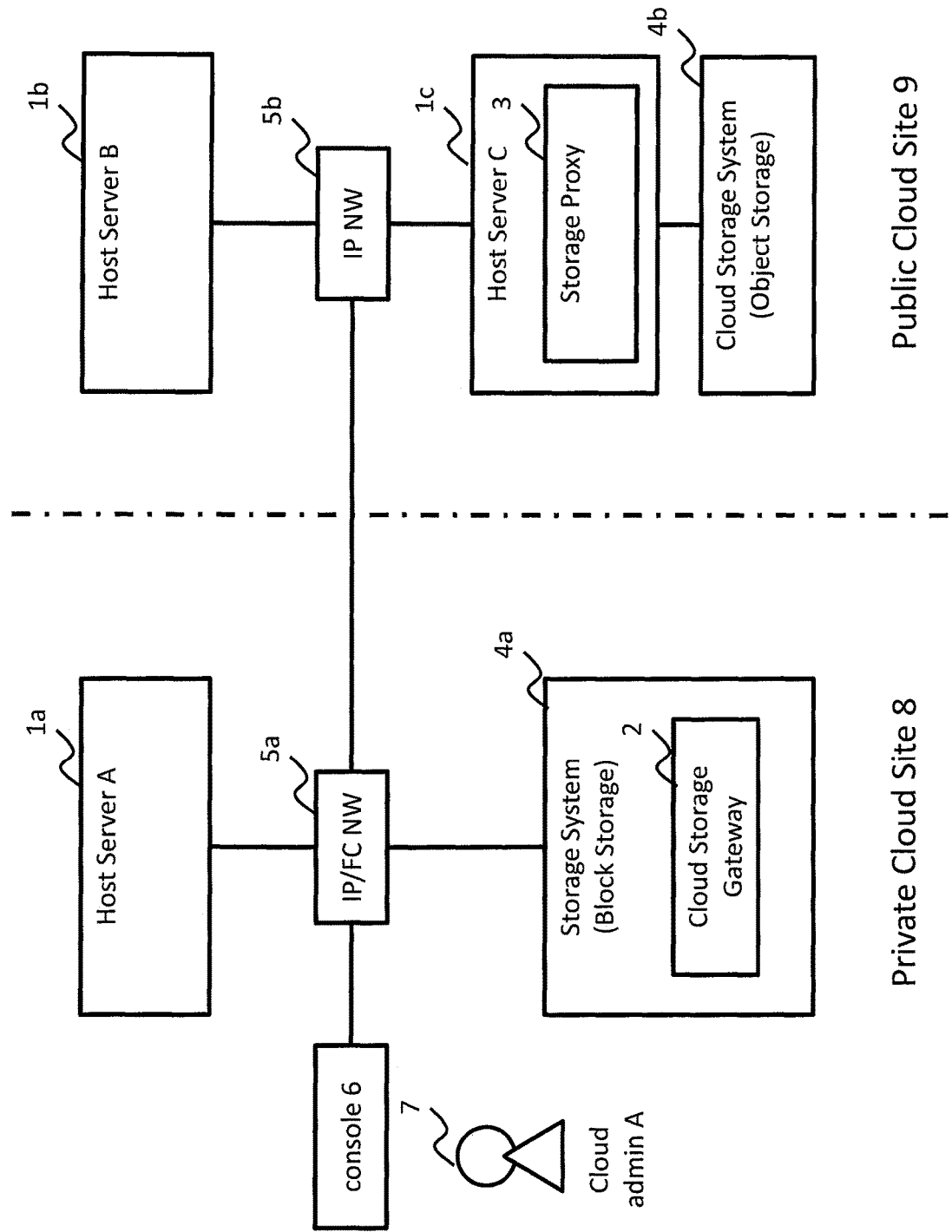
FIG. 17 illustrates an example of a hardware configuration of a multiple cloud environment for a computer system in which the method and apparatus of the invention may be applied according to a third embodiment.

FIG. 17 illustrates an example of a hardware configuration of a multiple cloud environment for a computer system in which the method and apparatus of the invention may be applied according to a third embodiment. FIG. 17 is similar to FIG. 1. A cloud storage gateway 2 is contained in the storage system 4a. A storage proxy 3 is contained in the host server 1c. The storage system 4a is block protocol storage and the cloud storage system 4b is object storage. The other components (host server A 1a, host server B 1b, IP/FC network 5a, IP network 5b, cloud administrator 7, and management console 6) are the same as those in FIG. 1.

Fourth Embodiment

Figure 18:
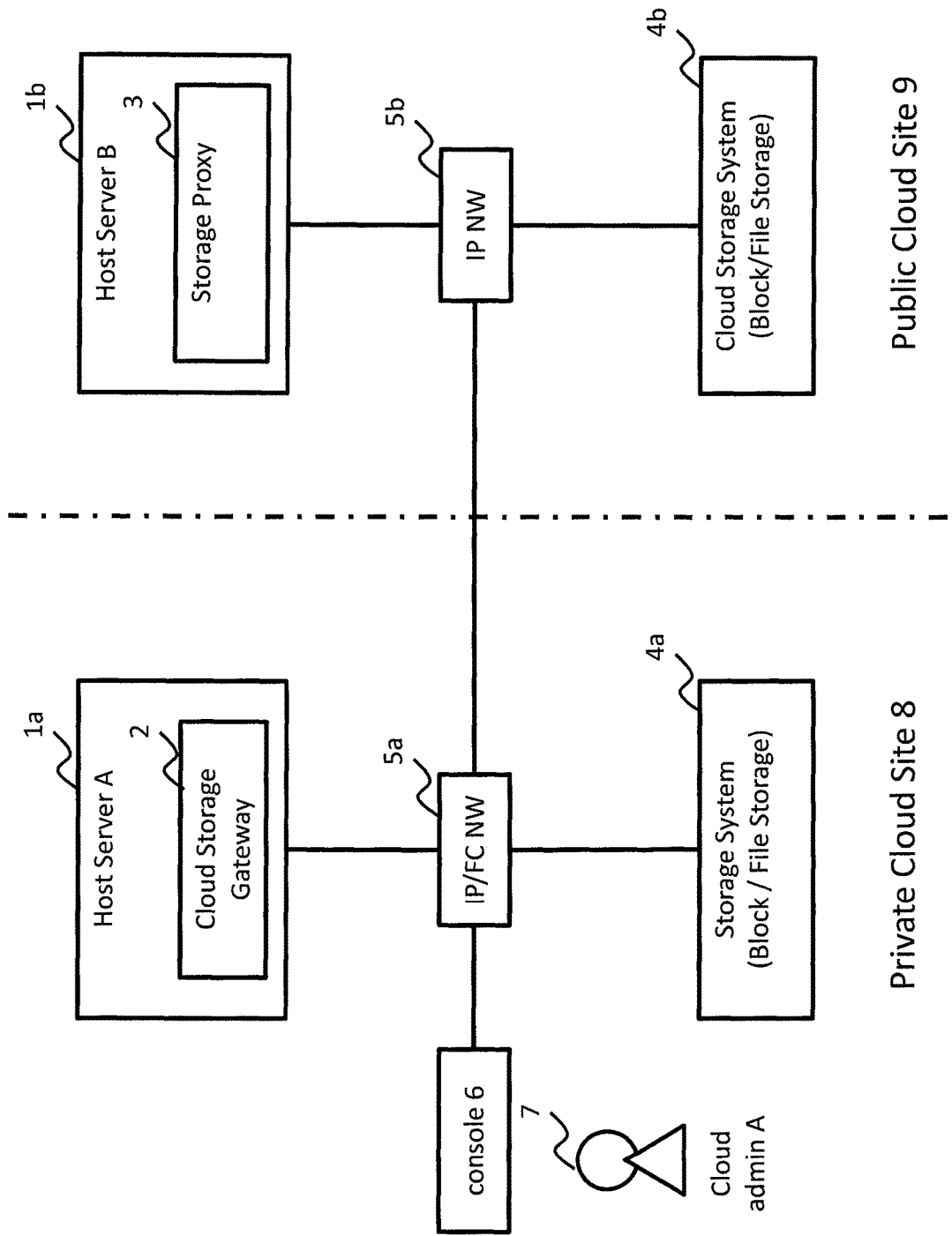
FIG. 18 illustrates an example of a hardware configuration of a multiple cloud environment for a computer system in which the method and apparatus of the invention may be applied according to a fourth embodiment.

FIG. 18 illustrates an example of a hardware configuration of a multiple cloud environment for a computer system in which the method and apparatus of the invention may be applied according to a fourth embodiment. FIG. 18 is similar to FIG. 1. A cloud storage gateway 2 is contained in host server 1a. A storage proxy 3 is contained in host server 1b. The storage system 4a is supported by block protocol and/or file protocol. The cloud storage system 4b is supported by block protocol and/or file protocol. The other components (IP/FC network 5a, IP network 5b, cloud administrator 7, and management console 6) are the same as those in FIG. 1.

Fifth Embodiment

Figure 19:
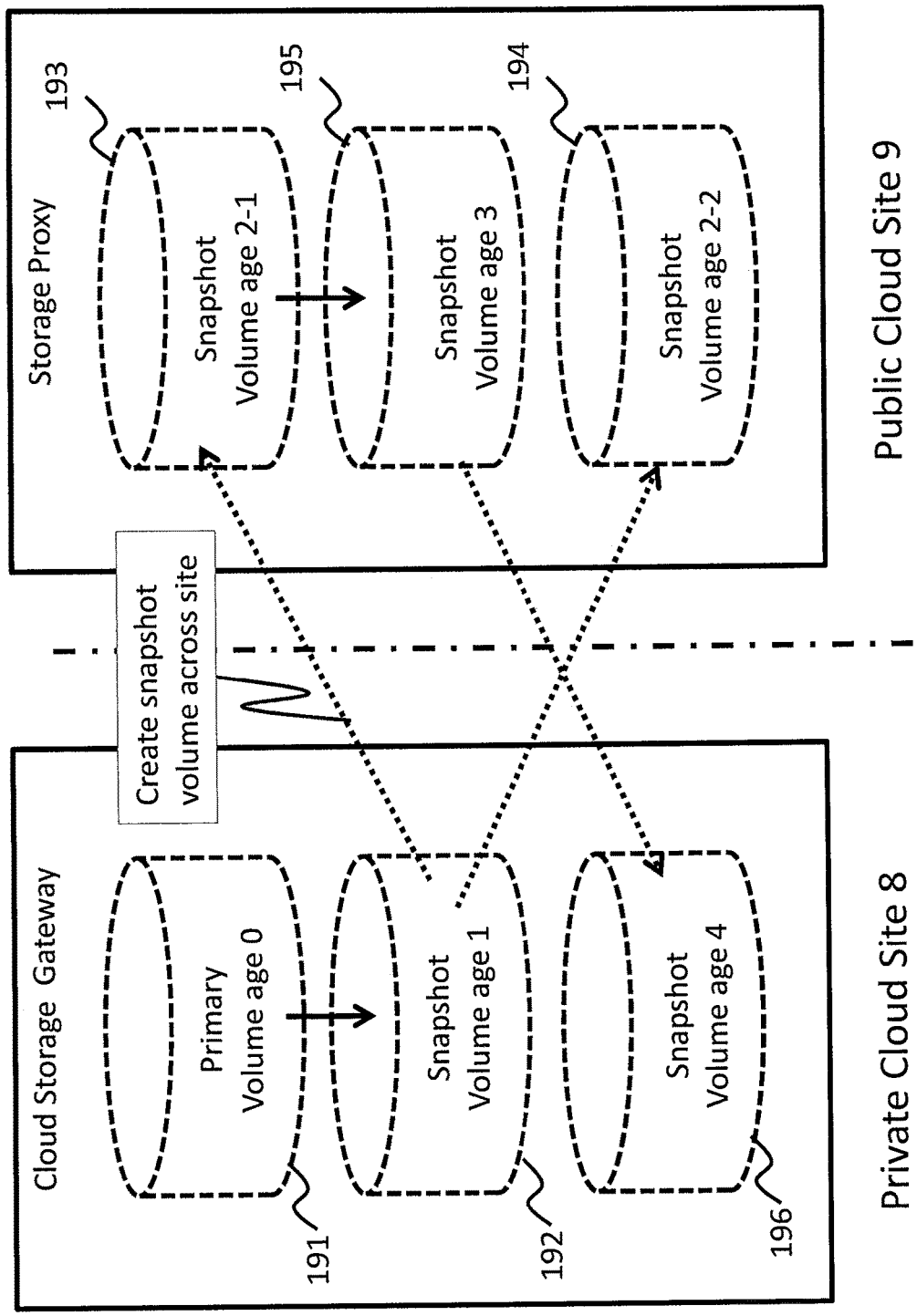
FIG. 19 shows an example of a process of creating snapshot volumes within the same site and across sites in accordance with a fifth embodiment of the invention.

FIG. 19 shows an example of a process of creating snapshot volumes within the same site and across sites in accordance with a fifth embodiment of the invention. On the private cloud site 8 are primary volume age 0 191, snapshot volume age 1 192, and snapshot volume age 4 196. On the public cloud site 9 are snapshot volume age 2-1 193, snapshot volume age 3 195, and snapshot volume age 2-2. The cloud storage gateway creates a primary volume age 0 191 in the cloud storage gateway. The cloud storage gateway creates new snapshot volume age 1 192 from the primary volume in the cloud storage gateway in the private cloud site 8 or across to the storage proxy in the public cloud site 9. The cloud storage gateway creates new snapshot volumes from a snapshot volume. A snapshot volume can cascade into multiple new snapshot volumes. All snapshot volumes can accept read and write operation from a host.

When the cloud storage gateway creates 1 new snapshot in the same cloud site (e.g., snapshot volume 192 is created based on primary volume 191, or snapshot volume 195 is created based on snapshot volume 193), there is no copy traffic across sites. When the cloud storage gateway creates a new snapshot from the private cloud site to the public cloud site (e.g., snapshot volume 193 or snapshot volume 194 is created based on snapshot volume 192), the cloud storage gateway copies hot data (or high access frequency data) to the public cloud site. When the cloud storage gateway creates a new snapshot from the public cloud site to the private cloud site (e.g., snapshot volume 196 is created based on snapshot 195), the cloud storage gateway copies allocation information based on the allocation information of the snapshot volume 195. Then the cloud storage gateway does not copy cold data from the public cloud site to the private cloud site, since network cost is expensive.

Figure 20:
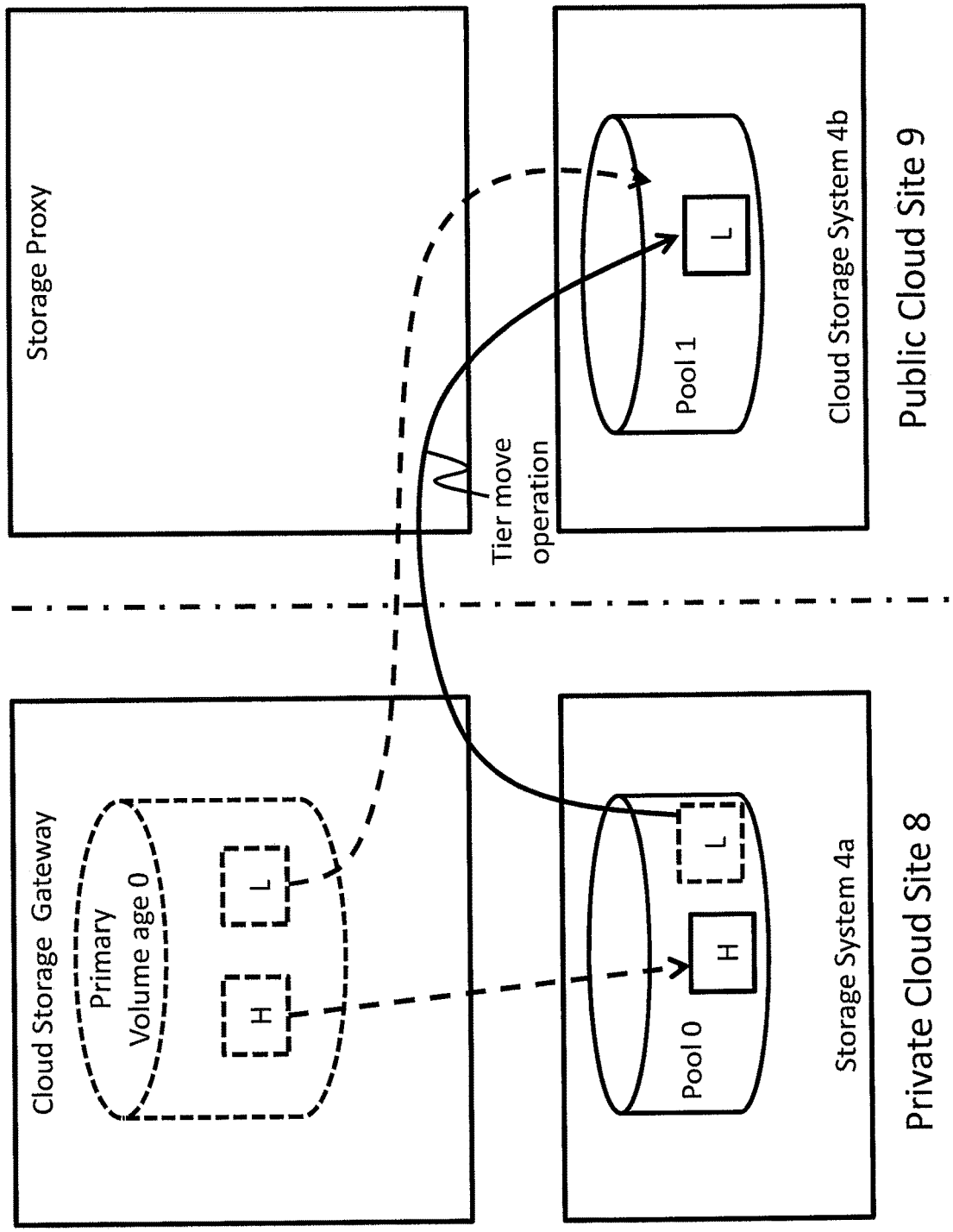
FIG. 20 shows an example of a tier move operation.

FIG. 20 shows an example of a tier move operation. The operation is prior art of cloud storage gateway. The cloud storage gateway has primary volume. A host application in the private cloud site accesses the primary volume. The cloud storage gateway updates read access frequency per segments in the volume. The cloud storage gateway moves low access frequency segments to the cloud storage system 4b in the public cloud site.

Figure 21:
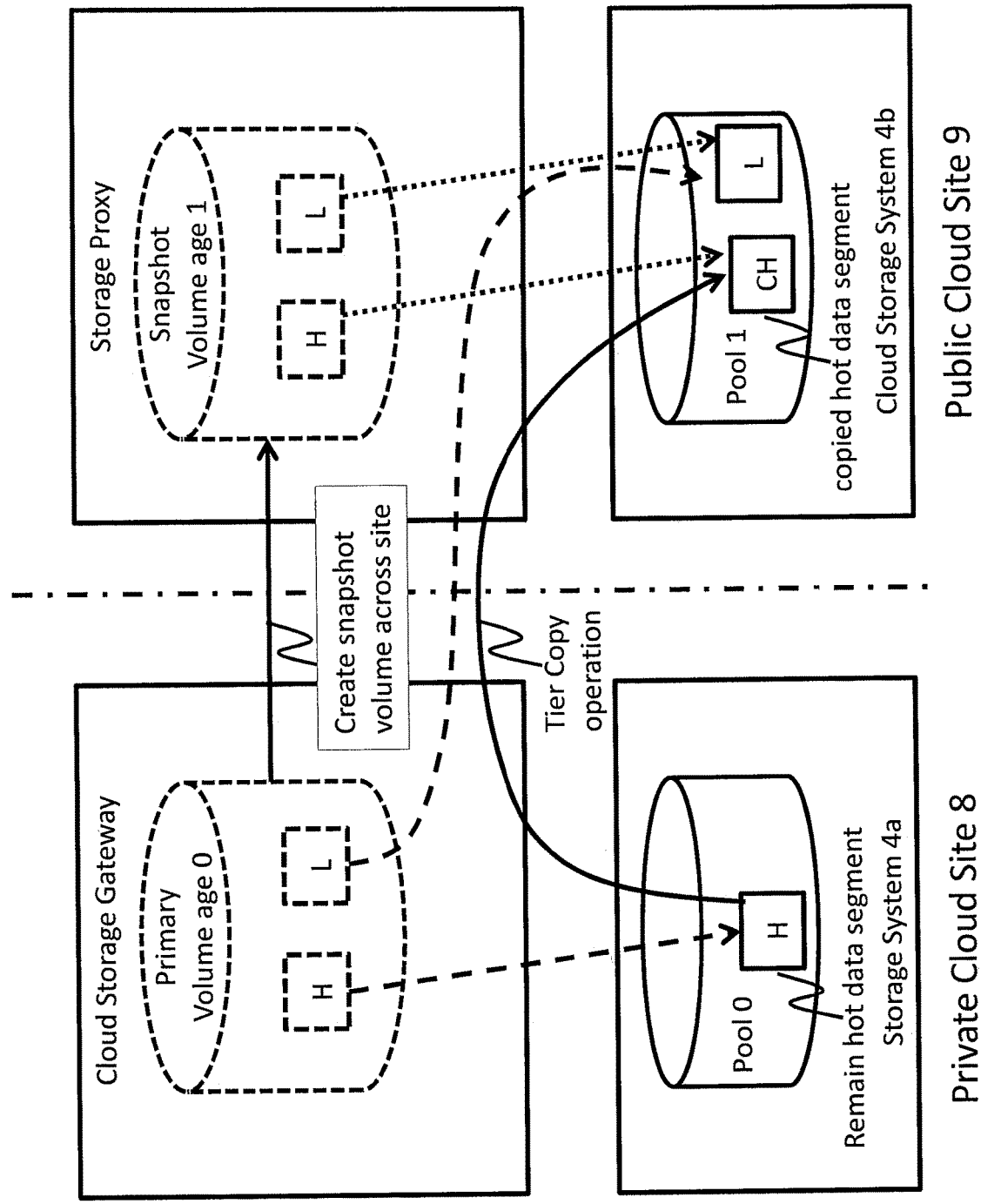
FIG. 21 shows an example of a tier copy operation.

FIG. 21 shows an example of a tier copy operation. The cloud storage gateway has primary volume. A host application in the private cloud site accesses a few hot data segments. The cloud storage gateway performs such that all low access segments in the primary volume are moved to the cloud storage system in the public cloud site. An administrator deploys application such as historical analytics. The cloud storage gateway judges whether the public cloud site or the private cloud site creates snapshot volume. The host application accesses entire segments in the snapshot volume, so that the cloud storage gateway creates snapshot volume across to the public cloud site. When the cloud storage gateway creates new snapshot volume in the public cloud site, the cloud storage gateway copies hot data segments to cloud storage system 4b (Pool 1) and updates table in the storage proxy. The administrator deploys application to the public cloud site and can access entire hot data and cold data segment. When a host in the private cloud reads data from the primary volume, hot data can be accessed in the private cloud site directly (Pool 0 of storage system 4a), while cold data can be accessed via the cloud storage system (Pool 1 of cloud storage system 4b). When a host in the public cloud reads data from the snapshot volume in the public cloud, both the cold data and the copied hot data can be accessed in the public cloud site directly (Pool 1 of cloud storage system 4b).

Figure 22:
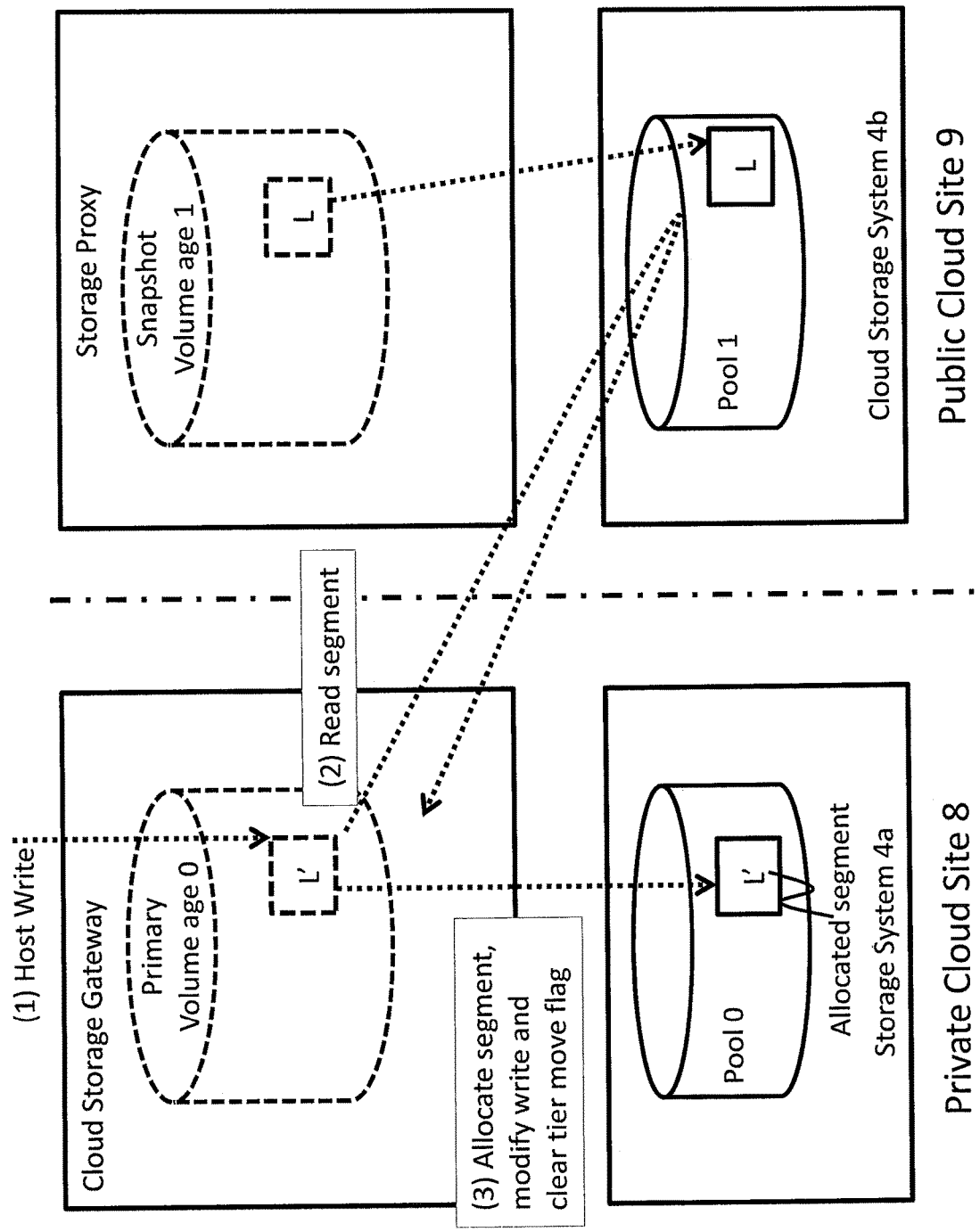
FIG. 22 shows an example of a host write operation to cold data in the private cloud.

FIG. 22 shows an example of a host write operation to cold data in the private cloud. The host writes to a primary or snapshot volume in the private cloud site (1). When the data segment is low access frequency (cold data, stored to public cloud site), the cloud storage gateway reads the segment from cloud storage system 4b (Pool 1) in the public cloud site (2). The cloud storage gateway modifies the read data by the host write data. The cloud storage gateway allocates segment (in Pool 0 of the storage system 4a) and stores the data to allocated segment. The cloud storage gateway clears the tier move flag (3).

Figure 23:
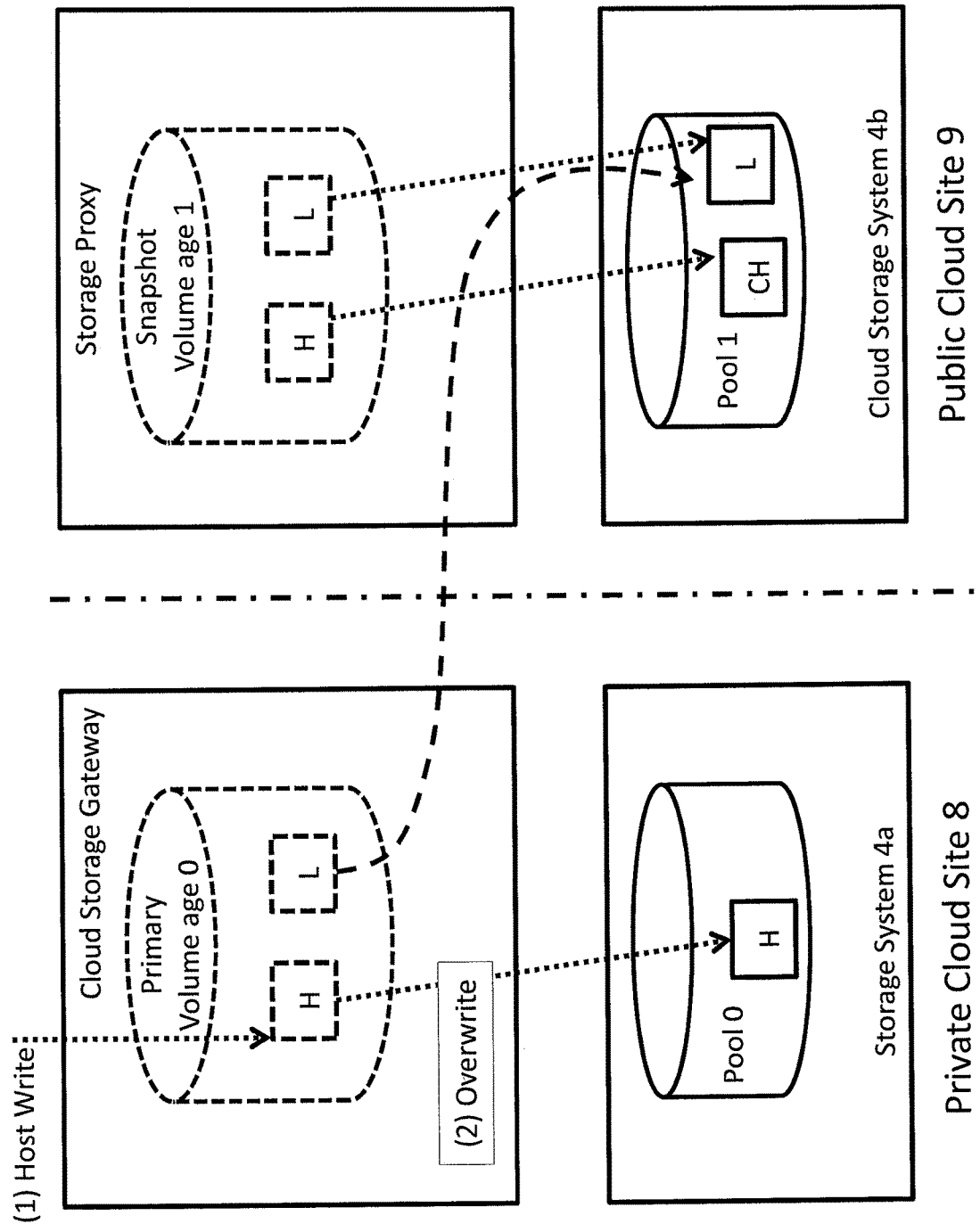
FIG. 23 shows an example of a host write operation to hot data in the private cloud.

FIG. 23 shows an example of a host write operation to hot data in the private cloud. The host writes to a primary or snapshot volume in the private cloud site (1). When the data segment is high access frequency (hot data, stored to private cloud site), the cloud storage gateway overwrites the segment in the storage system 4a in the private cloud site (2).

Figure 24:
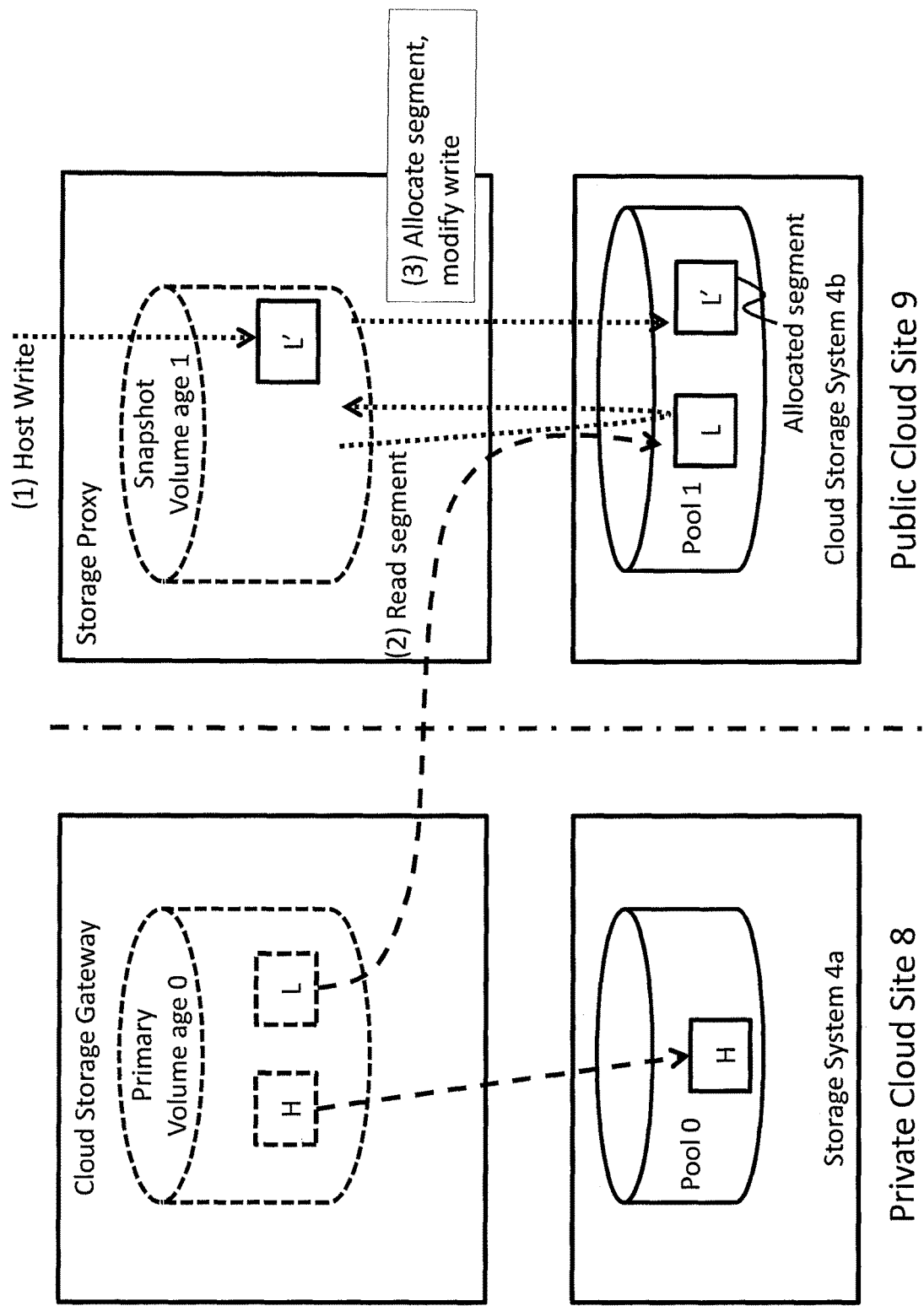
FIG. 24 shows an example of a host write operation to cold data in the public cloud.

FIG. 24 shows an example of a host write operation to cold data in the public cloud. The host writes to a primary or snapshot volume in the public cloud site (1). When the data segment is low access frequency (cold data, stored to public cloud site), the storage proxy reads the segment in the cloud storage system 4b (Pool 1) in the public cloud site (2). The storage proxy modifies the read data by the host write data. Then the storage proxy allocates segment (in Pool 1) and stores the data to allocated segment (3).

Figure 25:
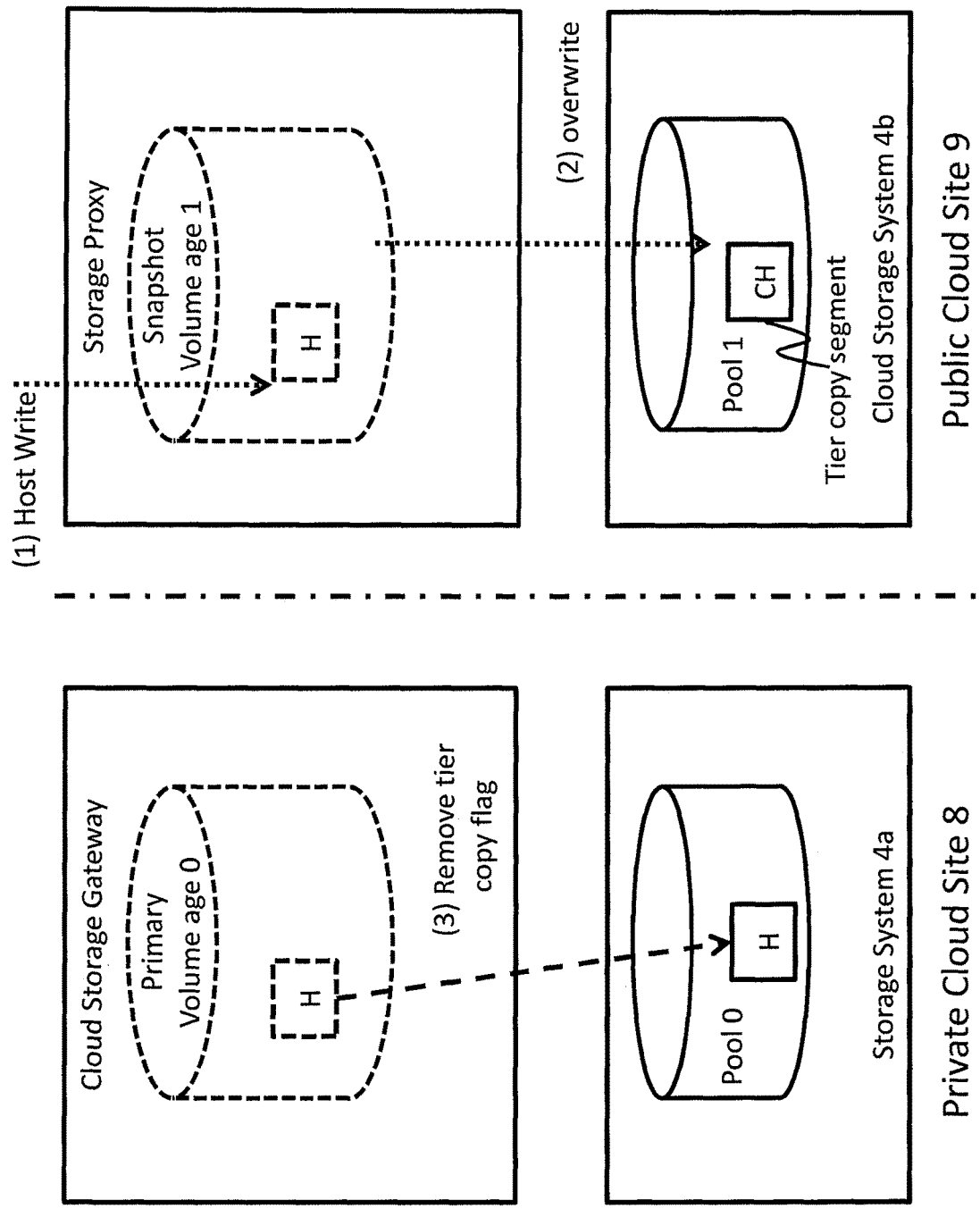
FIG. 25 shows an example of a host write operation to hot data in the public cloud.

FIG. 25 shows an example of a host write operation to hot data in the public cloud. The host writes to a primary or snapshot volume in the public cloud site (1). When the data segment is high access frequency (hot data, stored to private cloud site and tier copy segment to cloud storage system 4b), the storage proxy overwrites host data to the tier copy segment in cloud storage system (Pool 1) (2). The cloud storage gateway clears the tier move flag (3).

Figure 26:
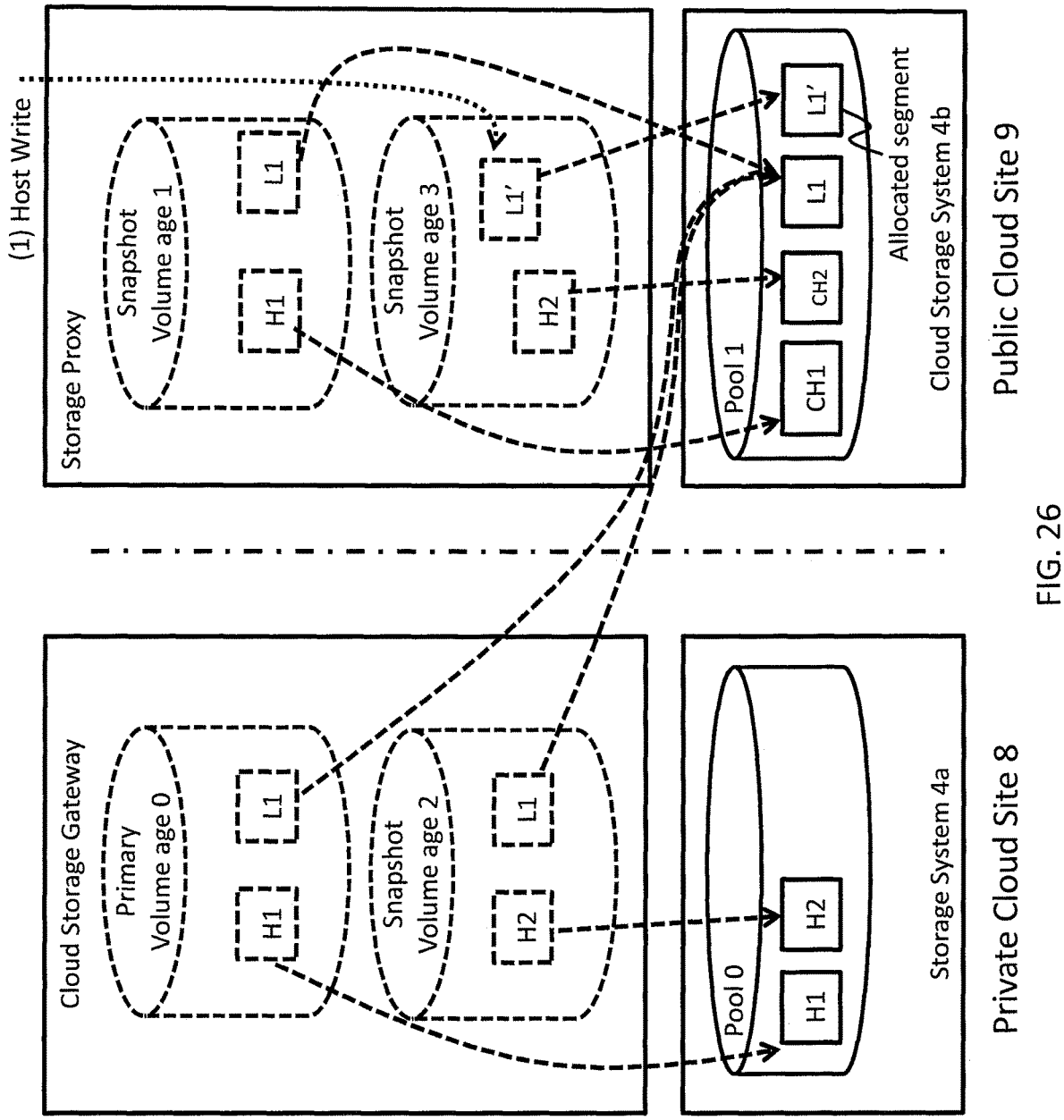
FIG. 26 shows an example of a host write operation involving multiple snapshots within site and across sites.

FIG. 26 shows an example of a host write operation involving multiple snapshots within site and across sites. The host read flows are similar to those of a single snapshot volume described in FIGS. 20 and 21. The host write flows are similar to those of a single snapshot volume described in FIGS. 22 and 25. For example, when the host writes to snapshot volume age 3, the storage proxy reads data from pool (Pool 1 in cloud storage system 4b), and then the storage proxy modifies the data and allocates new segment in Pool 1 in the cloud storage system 4b, and the storage proxy writes modified data to the allocated segment in Pool 1. This example is similar to the process described in FIG. 24.

Sixth Embodiment

Figure 27:
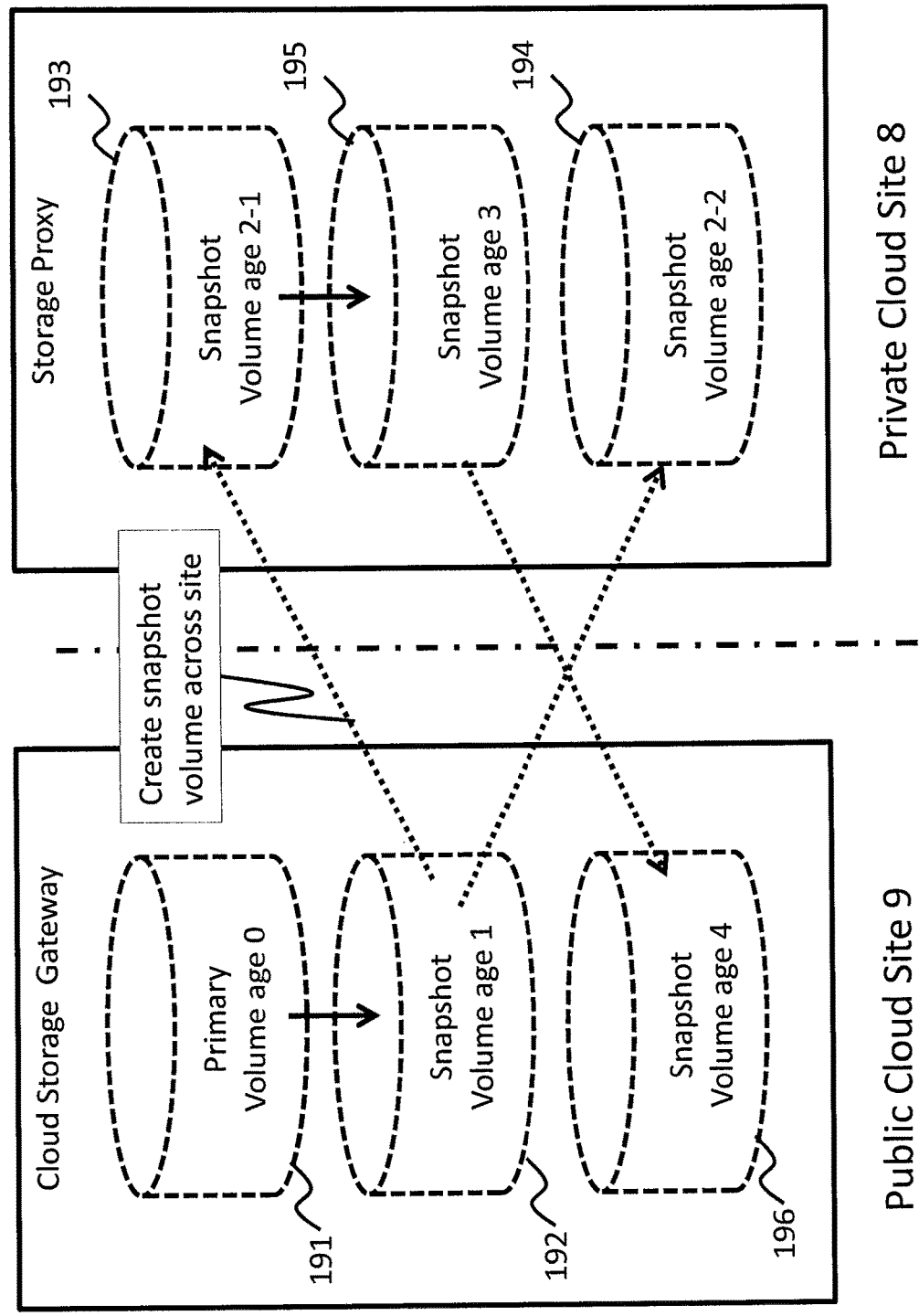
FIG. 27 shows an example of a process of creating snapshot volumes across sites in accordance with a sixth embodiment of the invention.

FIG. 27 shows an example of a process of creating snapshot volumes across sites in accordance with a sixth embodiment of the invention. FIG. 27 is identical to FIG. 19, except that the private cloud site 8 and public cloud site 9 are switched. The cloud storage gateway can be swapped to the public cloud site 9. Also, the storage proxy can swapped to the private cloud site 8.

Seventh Embodiment

Figure 28:
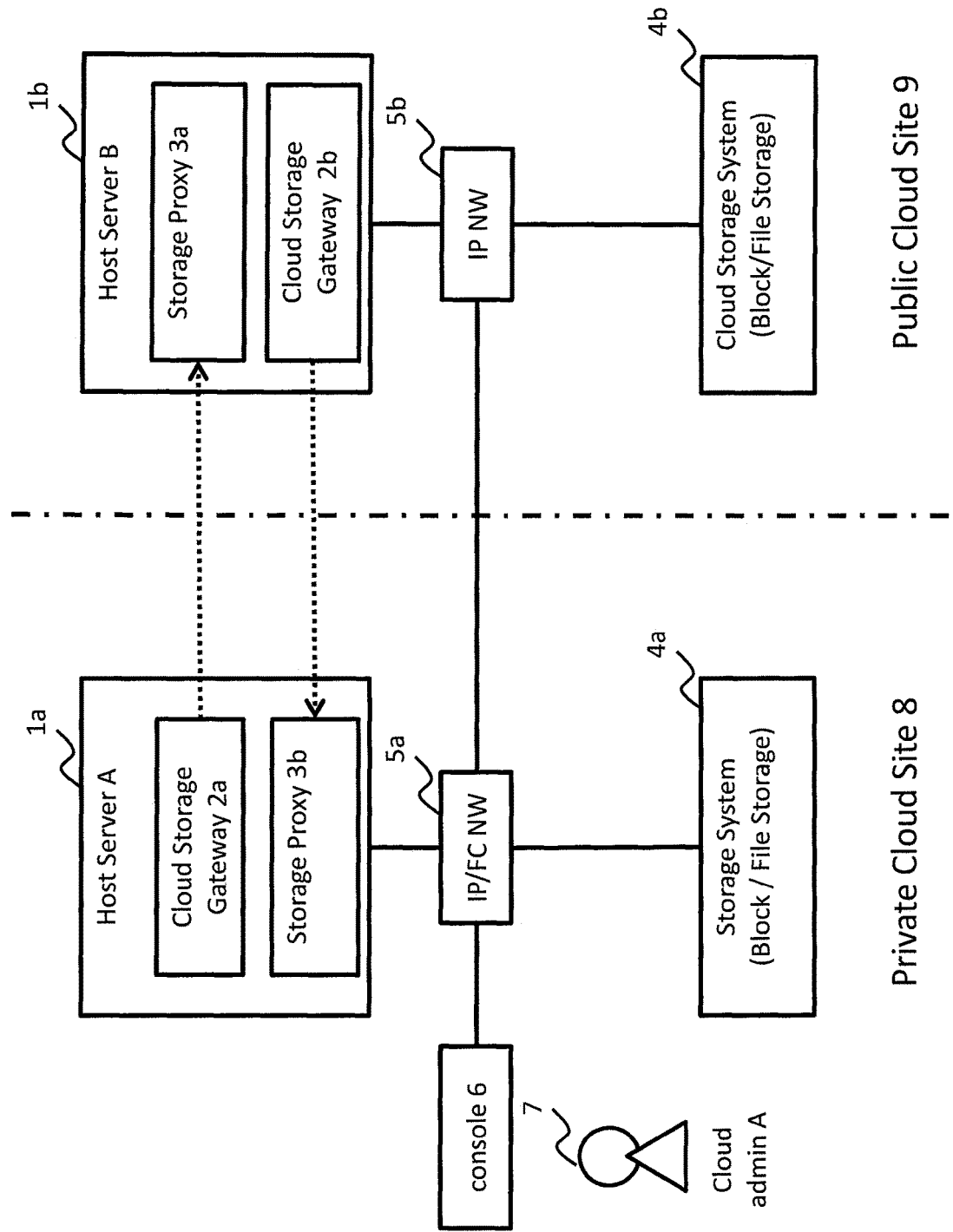
FIG. 28 illustrates an example of a hardware configuration of a multiple cloud environment for a computer system in which the method and apparatus of the invention may be applied according to a seventh embodiment.

FIG. 28 illustrates an example of a hardware configuration of a multiple cloud environment for a computer system in which the method and apparatus of the invention may be applied according to a seventh embodiment. FIG. 28 is similar to FIG. 18. A cloud storage gateway 2a is contained in host server 1a. A cloud storage gateway 2b is contained in host server 1b. A storage proxy 3a is contained in host server 1b. A storage proxy 3b is contained in host server 1a. The storage system 4a is supported by block protocol and/or file protocol. The cloud storage system 4b is supported by block protocol and/or file protocol. The other components (IP/FC network 5a, IP network 5b, cloud administrator 7, and management console 6) are the same as those in FIG. 1.

A volume is migrated from one pair to other pair of cloud storage gateway and storage proxy. When the volume is migrated to other pair on the public cloud site 9, the cloud storage gateway 2a moves the allocation information table to the cloud storage gateway 2b. No data segment is moved. When the volume is migrated to the cloud storage gateway 2b, the cloud storage gateway 2b controls the IO access frequency, tier move or tier copy process, and snapshot process.

Of course, the system configurations illustrated in FIGS. 1, 17, 18, and 28 are purely exemplary of information systems in which the present invention may be implemented, and the invention is not limited to a particular hardware configuration. The computers and storage systems implementing the invention can also have known I/O devices (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention. Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for providing shared storage between multiple cloud environments. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. A computer system coupled to a first storage system in a first site and a second storage system in a second site, the computer system comprising:
 a memory configured to store information which indicates that data in each segment of a plurality of segments of a logical unit is stored in the first storage system or the second storage system; and
 a processor configured to:
  receive an instruction to deploy an application, the instruction including access characteristic of the application; and
  determine if a snapshot of a logical volume is to be created either in the first storage system or the second storage system based on the access characteristic of the application and the information stored in the memory;
 wherein the computer system is disposed in the first site;
 wherein the processor is configured to create the snapshot of the logical volume in the second storage system based on the determining and to copy residual segments of the logical unit to the second storage system, the residual segments containing data for which no tier copy has been made; and wherein the processor is configured to:
calculate read IO (input/output) cost to read data from the second storage system based on the access characteristic of the application;
calculate capacity cost in the second storage system;
compare the read IO cost with the capacity cost; and
determine that the read IO cost is greater than the capacity cost, and then create the snapshot of the logical volume in the second storage system and copy residual segments of the logical unit to the second storage system, the residual segments containing data for which no tier copy has been made;
wherein the access characteristic of the application indicates whether to read the entire data in the logical unit or not and, if not, specifies a portion of the data to be read; and
wherein the read IO cost is calculated based on whether the entire data in the logical unit is read or a portion of the data is read.

2. The computer system according to claim 1,
wherein the processor is configured to indicate that the application is to be deployed in the second site.

3. The computer system according to claim 1,
wherein the capacity cost is calculated based on cloud media type to store the data, cost per capacity for each media type, cost per traffic for each media type, any capacity condition affecting the cost per capacity for each media type, and any capacity condition affecting the cost per traffic for each media type.

4. The computer system according to claim 1,
wherein the first site is a private cloud site and the second site is a public cloud site; and
wherein the first storage system is coupled to the second storage system via an IP (Internet Protocol) network.

5. The computer system according to claim 1, further comprising a cache memory divided into cache segments having a fixed segment size;
wherein the processor is configured to detect if there is insufficient cache capacity in a read/write operation or not and, if there is insufficient cache capacity in the read/write operation, then for each cache segment:
check to see if said each cache segment is clean or dirty;
if said cache segment is clean, delete the clean cache segment from the cache memory; and
if said cache segment is dirty, then check IO (Input/Output) access frequency for said dirty cache segment, and if the IO access frequency is lower than a preset threshold, then destage the dirty cache segment to the first storage system, and if the IO access frequency is not lower than the preset threshold, then destage the dirty cache segment to the second storage system.

6. The computer system according to claim 1,
wherein the capacity cost is calculated based on at least one of: cloud media type to store the data, cost per capacity for each media type, cost per traffic for each media type, any capacity condition affecting the cost per capacity for each media type, and any capacity condition affecting the cost per traffic for each media type.

7. A method of operating a computer system coupled to a first storage system in a first site and a second storage system in a second site, the method comprising:

storing information which indicates that data in each segment of a plurality of segments of a logical unit is stored in the first storage system or the second storage system; and
receiving an instruction to deploy an application, the instruction including access characteristic of the application;
determining if a snapshot of a logical volume is to be created either in the first storage system or the second storage system based on the access characteristic of the application and the information stored in the memory, wherein the computer system is disposed in the first site;
upon determining to create the snapshot of the logical volume in the second storage system, copying residual segments of the logical unit to the second storage system, the residual segments containing data for which no tier copy has been made;
calculating read IO (input/output) cost to read data from the second storage system based on the access characteristic of the application;
calculating capacity cost in the second storage system;
comparing the read IO cost with the capacity cost; and
determining that the read IO cost is greater than the capacity cost, and then creating the snapshot of the logical volume in the second storage system and copying residual segments of the logical unit to the second storage system, the residual segments containing data for which no tier copy has been made;
wherein the access characteristic of the application indicates whether to read the entire data in the logical unit or not and, if not, specifies a portion of the data to be read; and
wherein the read IO cost is calculated based on whether the entire data in the logical unit is read or a portion of the data is read.

8. The method according to claim 7,
wherein the capacity cost is calculated based on cloud media type to store the data, cost per capacity for each media type, cost per traffic for each media type, any capacity condition affecting the cost per capacity for each media type, and any capacity condition affecting the cost per traffic for each media type.

9. The method according to claim 7,
wherein the computer system includes a cache memory divided into cache segments having a fixed segment size; and
wherein the method further comprises detecting if there is insufficient cache capacity in a read/write operation or not and, if there is insufficient cache capacity in the read/write operation, then for each cache segment:
checking to see if said each cache segment is clean or dirty;
if said cache segment is clean, deleting the clean cache segment from the cache memory; and
if said cache segment is dirty, then checking IO (Input/Output) access frequency for said dirty cache segment, and
if the IO access frequency is lower than a preset threshold, then destaging the dirty cache segment to the first storage system, and if the IO access frequency is not lower than the preset threshold, then destaging the dirty cache segment to the second storage system.

10. The method according to claim 7, further comprising:
indicating that the application is to be deployed in the second site.

11. The method according to claim 7,
wherein the first site is a private cloud site and the second site is a public cloud site; and
wherein the first storage system is coupled to the second storage system via an IP (Internet Protocol) network.

12. The method according to claim 7,
wherein the capacity cost is calculated based on at least one of: cloud media type to store the data, cost per capacity for each media type, cost per traffic for each media type, any capacity condition affecting the cost per capacity for each media type, and any capacity condition affecting the cost per traffic for each media type.

13. A non-transitory computer-readable storage medium storing a plurality of instructions for controlling a data processor to operate a computer system coupled to a first storage system in a first site and a second storage system in a second site, the plurality of instructions comprising:
instructions that cause the data processor to store information which indicates that data in each segment of a plurality of segments of a logical unit is stored in the first storage system or the second storage system; and
instructions that cause the data processor to receive an instruction to deploy an application, the instruction including access characteristic of the application; and
instructions that cause the data processor to determine if a snapshot of the logical volume is to be created either in the first storage system or the second storage system based on the access characteristic of the application and the information stored in the memory, wherein the computer system is disposed in the first site;
instructions that cause the data processor to, upon determining to create the snapshot of the logical volume in the second storage system, copy residual segments of the logical unit to the second storage system, the residual segments containing data for which no tier copy has been made;
instructions that cause the data processor to calculate read IO (input/output) cost to read data from the second storage system based on the access characteristic of the application;
instructions that cause the data processor to calculate capacity cost in the second storage system;
instructions that cause the data processor to compare the read IO cost with the capacity cost; and
instructions that cause the data processor to determine that the read IO cost is greater than the capacity cost, and then create the snapshot of the logical volume in the second storage system and copy residual segments of the logical unit to the second storage system, the residual segments containing data for which no tier copy has been made;
wherein the access characteristic of the application indicates whether to read the entire data in the logical unit or not and, if not, specifies a portion of the data to be read; and
wherein the read IO cost is calculated based on whether the entire data in the logical unit is read or a portion of the data is read.

14. The non-transitory computer-readable storage medium according to claim 13, wherein the plurality of instructions further comprise:
instructions that cause the data processor to indicate that the application is to be deployed in the second site.

15. The non-transitory computer-readable storage medium according to claim 13,
wherein the capacity cost is calculated based on cloud media type to store the data, cost per capacity for each media type, cost per traffic for each media type, any capacity condition affecting the cost per capacity for each media type, and any capacity condition affecting the cost per traffic for each media type.

16. The non-transitory computer-readable storage medium according to claim 13,
wherein the first site is a private cloud site and the second site is a public cloud site; and
wherein the first storage system is coupled to the second storage system via an IP (Internet Protocol) network.

17. The non-transitory computer-readable storage medium according to claim 13, wherein the computer system further comprises a cache memory divided into cache segments having a fixed segment size, and wherein the plurality of instructions further comprise:
instructions that cause the data processor to detect if there is insufficient cache capacity in a read/write operation or not and, if there is insufficient cache capacity in the read/write operation, then for each cache segment:
check to see if said each cache segment is clean or dirty;
if said cache segment is clean, delete the clean cache segment from the cache memory; and
if said cache segment is dirty, then check IO (Input/Output) access frequency for said dirty cache segment, and if the IO access frequency is lower than a preset threshold, then destage the dirty cache segment to the first storage system, and if the IO access frequency is not lower than the preset threshold, then destage the dirty cache segment to the second storage system.

18. The non-transitory computer-readable storage medium according to claim 13,
wherein the capacity cost is calculated based on at least one of: cloud media type to store the data, cost per capacity for each media type, cost per traffic for each media type, any capacity condition affecting the cost per capacity for each media type, and any capacity condition affecting the cost per traffic for each media type.

* * * * *